United States Patent
Toyota et al.

(10) Patent No.: US 10,254,747 B2
(45) Date of Patent: Apr. 9, 2019

(54) DEVICE COOPERATION CONTROL SYSTEM, DEVICE CONTROL APPARATUS, DEVICE, METHOD FOR CONTROLLING DEVICES OF DEVICE COOPERATION CONTROL SYSTEM, AND PROGRAM THEREOF

(71) Applicant: Panasonic Intellectual Property Management Co., Ltd., Osaka (JP)

(72) Inventors: Hiromi Toyota, Kyoto (JP); Masato Murayama, Osaka (JP); Yoshiyuki Inoue, Kyoto (JP); Masaki Hayashi, Osaka (JP); Hiroki Nishida, Kyoto (JP); Yasuo Yoshimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 15/124,698

(22) PCT Filed: Apr. 8, 2015

(86) PCT No.: PCT/JP2015/001985
§ 371 (c)(1),
(2) Date: Sep. 9, 2016

(87) PCT Pub. No.: WO2015/155991
PCT Pub. Date: Oct. 15, 2015

(65) Prior Publication Data
US 2017/0017231 A1    Jan. 19, 2017

(30) Foreign Application Priority Data

Apr. 10, 2014  (JP) ................................. 2014-080844
May 12, 2014  (JP) ................................. 2014-098354

(51) Int. Cl.
G05B 19/4155  (2006.01)
G08C 17/02    (2006.01)
G05B 19/042   (2006.01)

(52) U.S. Cl.
CPC ..... *G05B 19/4155* (2013.01); *G05B 19/0421* (2013.01); *G08C 17/02* (2013.01);
(Continued)

(58) Field of Classification Search
None
See application file for complete search history.

(56) References Cited

U.S. PATENT DOCUMENTS

2003/0108331 A1* 6/2003 Plourde, Jr. .............. H04N 5/76
386/230
2006/0187858 A1* 8/2006 Kenichi ............. H04L 12/5692
370/254

(Continued)

FOREIGN PATENT DOCUMENTS

JP    2001-148892 A    5/2001
JP    2003-179699      6/2003
(Continued)

OTHER PUBLICATIONS

International Search Report of PCT application No. PCT/JP2015/001985 dated Jun. 30, 2015.

*Primary Examiner* — Tuan C Dao
(74) *Attorney, Agent, or Firm* — Brinks Gilson & Lione

(57) ABSTRACT

A device control apparatus periodically transmits a status confirmation signal to a control source device described in a cooperation control table and receives a response signal with respect to the status confirmation signal. Device control apparatus determines whether or not a status included in the response signal matches a status described in the cooperation control table. If they match, a control destination device, an operation and a control command corresponding to the operation are specified using the cooperation control table. A configuration for transmitting a control command with respect to the control destination device is provided. Therefore, even in a case where a communication protocol and the control command are different from one another in makers of devices, it is possible to realize cooperation control.

14 Claims, 14 Drawing Sheets

| No | CONTROL SOURCE DEVICE | STATUS | CONTROL DESTINATION DEVICE | OPERATION | CONTROL COMMAND/ CONTROL CODE |
|---|---|---|---|---|---|
| 1 | LIGHTING | ON | TELEVISION | ON | w1 |
| 2 | LIGHTING | ON | AIR CONDITIONER | ON | t1 |
| 3 | LIGHTING | OFF | AIR CONDITIONER (C COMPANY) | GOOD SLEEP AIR CONDITIONING | C1 |
| 4 | TELEVISION | ON | VENTILATION FAN | ON | u1 |
| 5 | VENTILATION FAN | ON | LIGHTING | RELAX LIGHTING | B1 |
| 6 | HUMAN BODY SENSOR | HUMAN BODY DETECTION | LIGHTING | ON | s1 |
| ... | | | | | |

(52) U.S. Cl.
CPC ............... *G05B 2219/25011* (2013.01); *G05B 2219/25144* (2013.01); *G05B 2219/25204* (2013.01); *G05B 2219/33068* (2013.01); *G08C 2201/51* (2013.01)

(56) References Cited

U.S. PATENT DOCUMENTS

| | | | | |
|---|---|---|---|---|
| 2006/0258400 | A1* | 11/2006 | Lee ................... | H04M 1/72527 455/557 |
| 2007/0204071 | A1* | 8/2007 | Bai ..................... | G06F 11/2247 710/8 |
| 2009/0092111 | A1* | 4/2009 | Horn .................... | H04W 48/02 370/338 |
| 2009/0121842 | A1* | 5/2009 | Elberbaum ............ | G08C 17/02 340/10.5 |
| 2012/0304715 | A1* | 12/2012 | Gore ..................... | G08B 13/04 70/344 |
| 2013/0031601 | A1* | 1/2013 | Bott ..................... | G06F 21/552 726/1 |
| 2015/0241859 | A1 | 8/2015 | Yabe et al. | |

FOREIGN PATENT DOCUMENTS

| | | |
|---|---|---|
| JP | 2004-248043 | 9/2004 |
| JP | 2006-033313 | 2/2006 |
| JP | 2006-172416 A | 6/2006 |
| JP | 5253617 B | 7/2013 |
| JP | 2015-033088 | 2/2015 |

\* cited by examiner

FIG. 5

| DEVICE | OPERATION | CONTROL COMMAND |
|---|---|---|
| LIGHTING | ON | s1 |
| LIGHTING | OFF | s2 |
| AIR CONDITIONER | ON | t1 |
| AIR CONDITIONER | OFF | t2 |
| AIR CONDITIONER | TEMPERATURE RISE | t3 |
| AIR CONDITIONER | TEMPERATURE FALL | t4 |
| VENTILATION FAN | ON | u1 |
| VENTILATION FAN | OFF | u2 |
| RICE COOKER | ON | v1 |
| RICE COOKER | OFF | v2 |
| TELEVISION | ON | w1 |
| TELEVISION | OFF | w2 |
| TELEPHONE | CALL ARRIVAL | d1 |
| INTERPHONE | BUTTON PRESS | d2 |
| HUMAN BODY SENSOR | HUMAN BODY DETECTION | d3 |
| ... | ... | ... |

FIG. 6

| CONTROL DESTINATION DEVICE | MAKER | CONTROL CODE | CONTENTS | TRANSMITTING DESTINATION |
|---|---|---|---|---|
| RICE COOKER | A | A1 | GOOD COOK | SERVER A |
| LIGHTING | B | B1 | RELAX LIGHTING | SERVER B |
| AIR CONDITIONER | C | C1 | GOOD SLEEP AIR CONDITIONING | SERVER C |
| ... | | | | |

FIG. 7

| No | CONTROL SOURCE DEVICE | STATUS | CONTROL DESTINATION DEVICE | OPERATION | CONTROL COMMAND/ CONTROL CODE |
|---|---|---|---|---|---|
| 1 | LIGHTING | ON | TELEVISION | ON | w1 |
| 2 | LIGHTING | ON | AIR CONDITIONER | ON | t1 |
| 3 | LIGHTING | OFF | AIR CONDITIONER (C COMPANY) | GOOD SLEEP AIR CONDITIONING | C1 |
| 4 | TELEVISION | ON | VENTILATION FAN | ON | u1 |
| 5 | VENTILATION FAN | ON | LIGHTING | RELAX LIGHTING | B1 |
| 6 | HUMAN BODY SENSOR | HUMAN BODY DETECTION | LIGHTING | ON | s1 |
| ... | | | | | |

| No | CONTROL SOURCE DEVICE | STATUS | CONTROL DESTINATION DEVICE | OPERATION | CONTROL COMMAND/CONTROL CODE |
|---|---|---|---|---|---|
| 1 | LIGHTING | ON | TELEVISION | ON | w1 |
| 2 | LIGHTING | ON | AIR CONDITIONER | ON, 23 DEGREES ARE SET | t1 |
| 3 | TELEVISION | ON | LIGHTING | OFF | s2 |
| ... | | | | | |

FIG. 13

| No | CONTROL SOURCE DEVICE | STATUS | CONTROL DESTINATION DEVICE | OPERATION | CODE | ADDITIONAL OPERATION |
|---|---|---|---|---|---|---|
| 1 | LIGHTING | ON | TELEVISION | ON | w1 | |
| 2 | TELEVISION | ON | AIR CONDITIONER | ON | t1 | AFTER 2 SECONDS |
| ... | | | | | | |

FIG. 14

| No | CONTROL SOURCE DEVICE | STATUS | CONTROL DESTINATION DEVICE | OPERATION | CODE |
|---|---|---|---|---|---|
| 1 | LIGHTING | ON | TELEVISION, AIR CONDITIONER | ON | w1,t1 |
| ... | | | | | |

FIG. 15

| No | CONTROL SOURCE DEVICE | STATUS | CONTROL DESTINATION DEVICE | OPERATION | CODE |
|---|---|---|---|---|---|
| 1 | LIGHTING, VENTILATION FAN | ON | TELEVISION | ON | w1 |
| ... | | | | | |

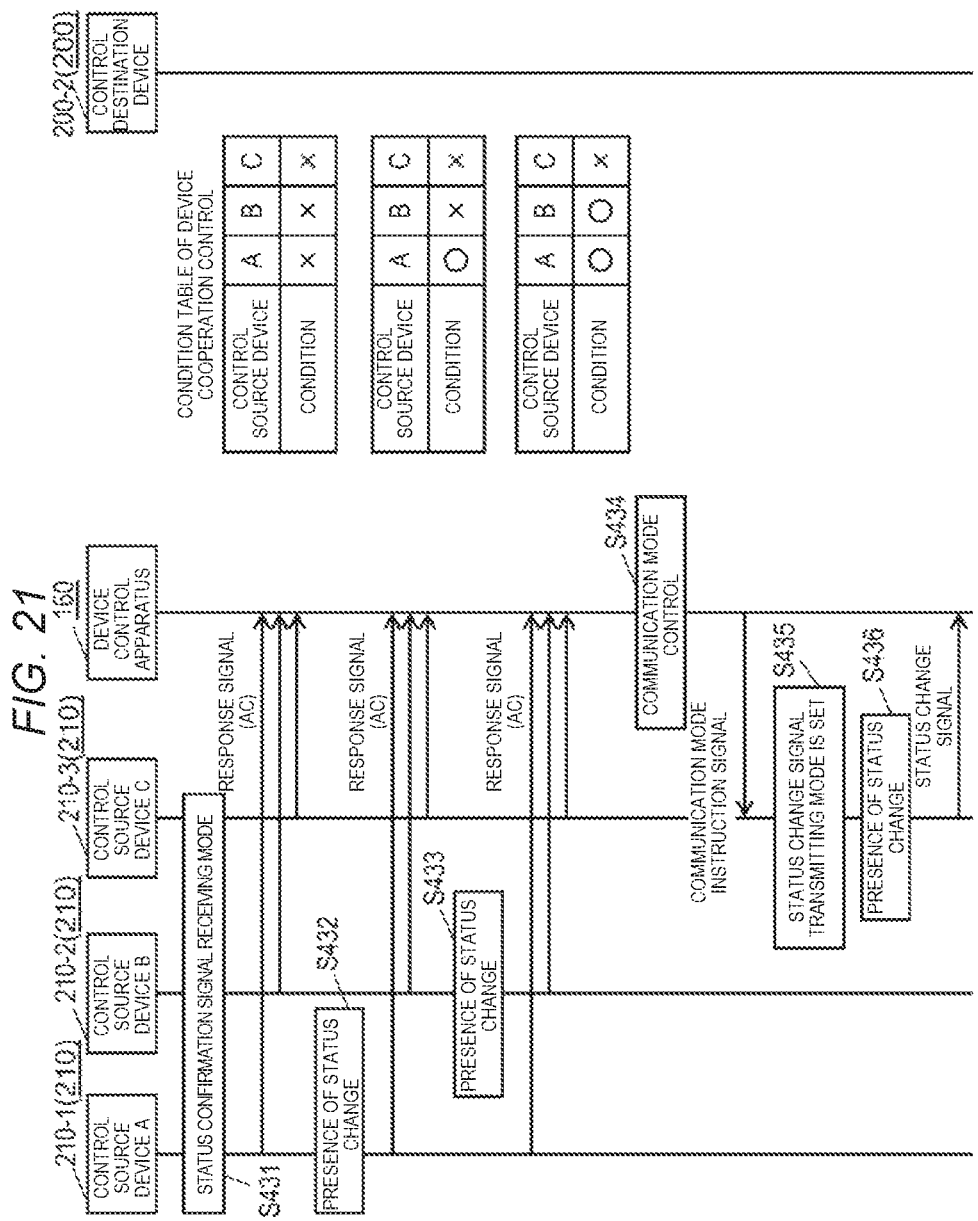

DEVICE COOPERATION CONTROL SYSTEM, DEVICE CONTROL APPARATUS, DEVICE, METHOD FOR CONTROLLING DEVICES OF DEVICE COOPERATION CONTROL SYSTEM, AND PROGRAM THEREOF

This application is a U.S. National phase application of pct International Application PCT/JP2015/001985.

TECHNICAL FIELD

The present invention relates to a device cooperation control system, a device control apparatus, a device, a method for controlling a device of a device cooperation control system, and a program thereof.

BACKGROUND ART

In the related art, a device cooperation control system including a household electrical controller (device control apparatus) and devices such as a first device and a second device is proposed (for example, see PTL 1).

The household electrical controller of the device cooperation control system is connected to the first device and the second device by wireless communication. The household electrical controller transmits a setting notification of a status to the second device in a case where a status change is a specific status when receiving a notification of the status change from the first device. Therefore, the device cooperation control system is configured to change an operation status of the second device.

In this case, the household electrical controller and the devices configuring the device cooperation control system of the related art are based on the assumption that the same maker manufactures all the controllers and the devices. Thus, the device cooperation control system of the related art facilitates that the maker adjusts a structure (for example, communication protocol, control command, and the like between the household electrical controller and the devices) for performing cooperation control.

However, the household electrical controller and the devices manufactured by various makers are mixed on an inside of a house. That is, the maker of the household electrical controller and the maker of the devices to be wirelessly connected may be different from one another. In addition, the makers of the first device and the second device wirelessly connected to the household electrical controller may be different from one another. Thus, since the household electrical controller and the devices of which the makers are different from one another are typically different in the communication protocol or the control command, it is not easy to realize the cooperation control of the devices.

Then, in recent years, there has been a movement to formulate communication standards for the household electrical device and standardize the communication protocol and the control command of each device. Therefore, the communication and control between the devices manufactured by different makers can be performed. However, a maker aims to differentiate itself from other companies by equipping a device with a unique feature and intends to provide an advantage to promote business competition. Thus, the maker is considered to be passive regarding standardization of all the control commands.

That is, in a case where the communication protocol and the control command of the devices are different for each maker, there is a problem that the device cooperation control cannot be realized.

CITATION LIST

Patent Literature

PTL 1: Japanese Patent Unexamined Publication No. 2006-033313

SUMMARY OF THE INVENTION

The present invention provides a device cooperation control system, which can realize device cooperation control even if a communication protocol and a control command of devices are different from one another for each maker, a device control apparatus, a device, a method for controlling devices, and a program thereof.

That is, the invention is a device cooperation control system including a device control apparatus; and at least a first device and a second device. The device control apparatus includes a transmitting and receiving unit that transmits a status confirmation signal to the first device and receives a response signal with respect to the status confirmation signal, and a storage unit that stores control contents of the second device to correspond to the status of the first device. The transmitting and receiving unit has a configuration for acquiring the control contents of the second device corresponding to a status indicated in the response signal from the storage unit and transmitting the control contents to the second device.

Therefore, in a case where the status of the first device is changed, even in a specification in which the first device does not notify the device control apparatus of the change of the status, the device control apparatus grasps the status of the first device and can realize the cooperation control to the second device without delay.

BRIEF DESCRIPTION OF DRAWINGS

FIG. 5 is a diagram illustrating a standard control command table in Embodiment 1.

FIG. 6 is a diagram illustrating a unique control code table in Embodiment 1.

FIG. 7 is a diagram illustrating a cooperation control table in Embodiment 1.

FIG. 13 is a diagram illustrating a modification example of the cooperation control table in Embodiment 2.

FIG. 14 is a diagram illustrating another modification example of the cooperation control table in Embodiment 2.

FIG. 15 is a diagram illustrating further another modification example of the cooperation control table in Embodiment 2.

FIG. 21 is a sequence diagram of a device cooperation control system in Embodiment 5.

DESCRIPTION OF EMBODIMENTS

Hereinafter, embodiments of the invention will be described with reference to the drawings. The invention is not limited to the embodiments.

Embodiment 1

Hereinafter, a device cooperation control system in Embodiment 1 will be described with reference to FIG. 1.

Figure 1:
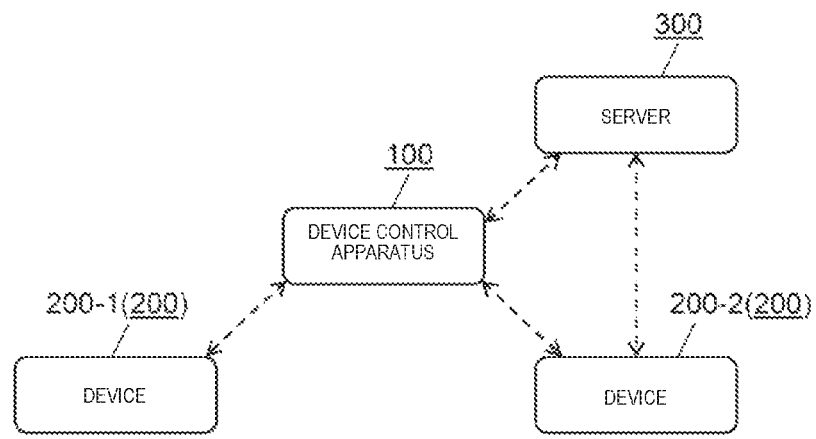
FIG. 1 is a configuration diagram of a device cooperation control system in Embodiment 1.

FIG. 1 is a configuration diagram of the device cooperation control system in Embodiment 1.

As illustrated in FIG. 1, the device cooperation control system of the embodiment includes at least device control apparatus 100, device 200, server 300, and the like as a server or apparatuses set on an inside of a house. In FIG. 1, a device cooperation control system that is configured to include two devices 200 denoted with device 200-1 and device 200-2 are exemplified, but the invention is not limited to the example. For example, devices 200 may be three or more. Here, device 200-1 is exemplified as a control source device and may be referred to as a first device. Similarly, device 200-2 is exemplified as a control destination device and may be referred to as a second device.

Specifically, device 200 is a household electrical device set on an inside of a house including a wireless function. As types of the household electrical devices, for example, black goods such as televisions and audio consumer electronics, or white goods such as refrigerators, lightings and air conditioners are equivalent. In addition, device 200 also includes a telephone, an interphone, a temperature sensor, a human body sensor detecting the human body, and the like.

Furthermore, device 200 may correspond to an electrical and thermal energy generation device such as a fuel cell, a solar cell, an electric vehicle, and a water heater. In a case where device 200 is the electrical and thermal energy generation device, device control apparatus 100 correspond to, for example, a Home Energy Management System (HEMS) controller and a Building Energy Management System (BEMS) controller.

Device 200-1 and device 200-2 may be the same household electrical device or may be household electrical devices of different types.

The device cooperation control system of the embodiment functions as follows.

First, device control apparatus 100 grasps that device 200-1 corresponding to the first device (or the control source device) is in a specific status. In this case, device control apparatus 100 controls device 200-2 corresponding to the second device (or the control destination device) to cause device 200-2 to perform a specific operation. In this case, device control apparatus 100 controls device 200-2 by transmitting a signal to device 200-2 to perform the specific operation directly or via server 300.

In this case, server 300 is provided, for example, on an outside of a house or on an inside of a house and is configured of a server which is provided by a maker manufacturing device 200-2. Thus, a unique server exists for each maker of the device. That is, even though not illustrated in FIG. 1, for example, in a case where the maker of device 200-1 and the maker of device 200-2 are different from one another, a server connected to device 200-1 exists separately from server 300.

Device control apparatus 100, device 200-1, and device 200-2 are illustrated in FIG. 1 as individual devices, but the invention is not limited to the example. For example, device control apparatus 100 may be configured integrally with device 200 by incorporating into device 200-1 or device 200-2. In addition, device control apparatus 100 may also serve as a remote controller of device 200-1 or a home controller for controlling entire devices in a house. Furthermore, device control apparatus 100 may also serve as a communication control apparatus (for example, a gateway and the like) for performing communication control with device 200-1 and server 300, a mobile phone, a mobile terminal, or a personal computer which is held by a resident of a house.

The device cooperation control system of the embodiment is configured as described above.

Hereinafter, a configuration of the device control apparatus of the device cooperation control system will be described using FIG. 2 while referring to FIG. 1.

Figure 2:
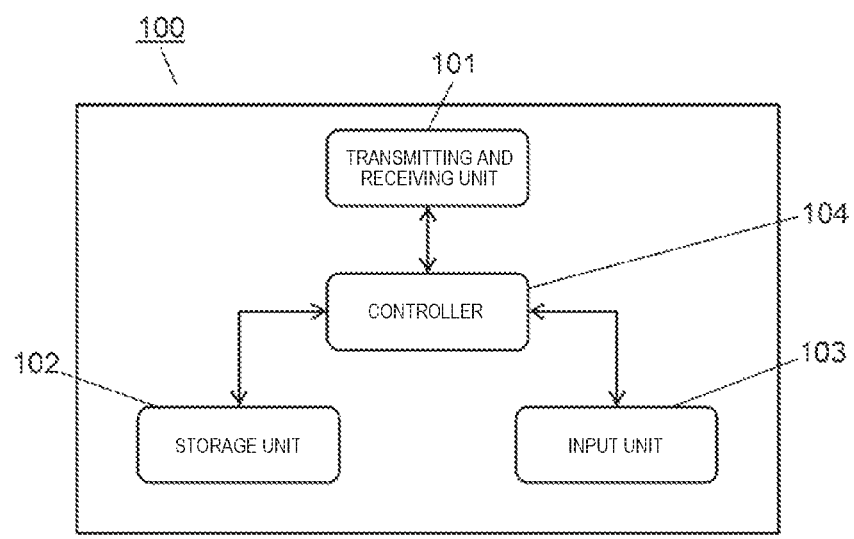
FIG. 2 is a configuration diagram of a device control apparatus in Embodiment 1.

FIG. 2 is a configuration diagram of the device control apparatus in Embodiment 1.

As illustrated in FIG. 2, device control apparatus 100 includes at least transmitting and receiving unit 101, storage unit 102, input unit 103, controller 104, and the like.

Transmitting and receiving unit 101 performs wireless communication with device 200-1, device 200-2, or server 300 illustrated in FIG. 1, and transmits and receives various wireless signals. The wireless communication is realized by, for example, public wireless line, wireless LAN, Bluetooth (registered trademark), low-power wireless, infrared communication, and the like. Wired communication such as Ethernet (registered trademark), power line communication, and the like may be provided.

Storage unit 102 stores a standard control command table, a unique control code table, a cooperation control table, and the like which are described below. Storage unit 102 is realized by, for example, a recording medium such as a hard disk drive and a semiconductor memory.

Input unit 103 is used for inputting contents of the cooperation control table stored in storage unit 102. Input unit 103 is realized, for example, by an input apparatus such as a keyboard or a receiving unit for receiving data input from an external communication terminal such as a smart phone. In a case of the receiving unit described above, it may be replaced by transmitting and receiving unit 101 of device control apparatus 100.

Controller 104 appropriately controls transmitting and receiving unit 101, storage unit 102, input unit 103, and the like. Therefore, device control apparatus 100 realizes device cooperation control of the device cooperation control system via controller 104.

Device control apparatus 100 of the embodiment is configured as described above.

Hereinafter, a configuration of device 200 of the device cooperation control system will be described with reference to FIG. 3.

Figure 3:
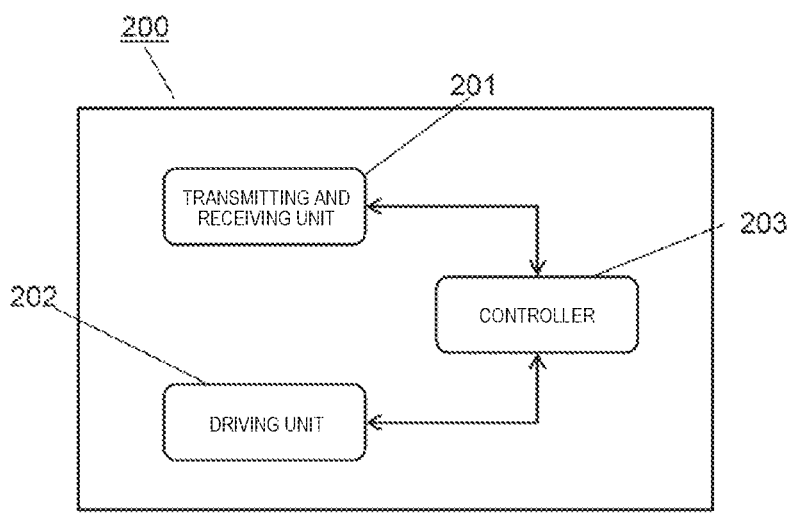
FIG. 3 is a configuration diagram of a device in Embodiment 1.

FIG. 3 is a configuration diagram of the device in Embodiment 1.

As illustrated in FIG. 3, device 200 includes at least transmitting and receiving unit 201, driving unit 202, controller 203, and the like.

Transmitting and receiving unit 201 performs the wireless communication with device control apparatus 100 and transmits and receives various wireless signals. Similar to transmitting and receiving unit 101 of device control apparatus 100, the wireless communication is realized, for example, by the public wireless line, the wireless LAN, and the like. Transmitting and receiving unit 201 may be configured to transmit and receive the wired communication with device control apparatus 100.

Device 202 realizes the function of device 200 by driving device 200. Specifically, for example, in a case where device 200 is the air conditioner, an element realizing the function of device 200 corresponds to a compressor. In a case of lighting, the element corresponds to a fluorescent lamp and in a case of the television, the element corresponds to a speaker or a liquid crystal display. Furthermore, in a case where device 200 is a sensor such as the human body sensor or the temperature sensor, driving unit 202 corresponds to a sensing unit.

Controller 203 appropriately controls transmitting and receiving unit 201, driving unit 202, and the like. Controller 203 controls driving unit 202 in accordance with a control command received by transmitting and receiving unit 201. Therefore, device 200 realizes the device cooperation control of the device cooperation control system via controller 203.

Device 200 of the device cooperation control system in the embodiment is configured as described above.

Hereinafter, a configuration of server 300 of the device cooperation control system will be described using FIG. 4 while referring to FIG. 1.

Figure 4:
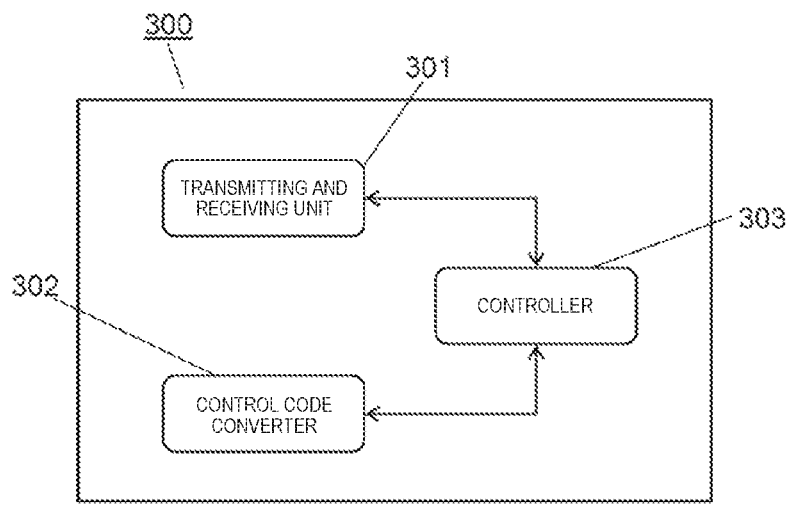
FIG. 4 is a configuration diagram of a server in Embodiment 1.

FIG. 4 is a configuration diagram of the server in Embodiment 1.

As illustrated in FIG. 4, server 300 includes at least transmitting and receiving unit 301, control code converter 302, controller 303, and the like.

As illustrated in FIG. 1, transmitting and receiving unit 301 performs the wireless communication with device control apparatus 100 and device 200-2 that is the second device, and transmits and receives various wireless signals. The wireless communication is realized, for example, by the public wireless line, the wireless LAN, and the like.

Control code converter 302 converts a device code transmitted from device control apparatus 100 into a control command corresponding to the device code.

A control code is associated with a combination of a plurality of standard control commands or a unique control command of a maker. For example, a control content that is uniquely determined by a C company such as "good sleep conditioning" in an air conditioner manufactured by the C company exists in the unique control code table described below with reference to FIG. 6. The control content of the "good sleep conditioning" is, specifically, configured by repeating a combination of the control contents such as temperature rise and temperature fall of the standard control command illustrated in FIG. 5.

Controller 303 appropriately controls transmitting and receiving unit 301, control code converter 302, and the like. Therefore, server 300 realizes the device cooperation control of the device cooperation control system via controller 303.

Server 300 of the device cooperation control system in the embodiment is configured as described above.

Hereinafter, an example of a table indicating the control contents stored in storage unit 102 of device control apparatus 100 will be described with reference to FIGS. 5 to 7.

FIG. 5 is a diagram illustrating a standard control command table in Embodiment 1. FIG. 6 is a diagram illustrating the unique control code table in Embodiment 1. FIG. 7 is a diagram illustrating the cooperation control table in Embodiment 1.

First, standard control command table describes, as illustrated in FIG. 5, for example, types of devices, operations of the devices, the control commands for operating the devices, and the like for each type of the device. Here, the control commands of standard control command table are commonly determined regardless of difference in the maker manufacturing device 200. That is, device 200 which receives the control command can decrypt an instruction content of the control command even in a case where the maker is different. Thus, device 200 can be changed to an operation indicated by the instruction content of the control command.

Contents of the control command of standard control command table can be obtained from, for example, an organization that formulates a communication standard for the household electrical devices and the like. Specifically, the contents of the control command of standard control command table can be determined in object detailed definitions in ECHONET Lite (registered trademark) standard.

In addition, the unique control code table describes, as illustrated in FIG. 6, for example, the types of the devices, makers manufacturing the devices, the control codes for operating the devices, contents indicated by the control codes, addresses of transmitting destinations to which the control codes are transmitted, and the like, for each type of the device. Here, the control codes are uniquely determined by the maker manufacturing device 200. That is, in a case of device 200 of which the maker is different, even if a control code of a different maker is received, the instruction content (control content) cannot be decrypted. Therefore, typically, device 200 of which the maker is different cannot be changed to an operation indicated by the instruction content of the control code.

Hereinafter, in a case where device 200 is operated by the control codes described in the unique control code table, a method of processing will be described in detail.

The unique control code table illustrated in FIG. 6 describes, for example, a rice cooker of which a maker is an A company, lighting of which a maker is a B company, the control codes and contents regarding an air conditioner of which a maker is the C company, addresses of servers of transmitting destinations to be connected, and the like.

In this case, a control content uniquely determined by the A company such as "good cook" to the rice cooker of which the maker is the A company is executed from device control apparatus 100, processing is performed as follows.

First, device control apparatus 100 transmits a control code A1 to a server A of the transmitting destination.

Next, the server A that receives the control code A1 converts the control code A1 into a predetermined control command.

Next, the server A transmits the control command to the rice cooker of the A company.

Therefore, it is possible to execute a process such as "good cook" in the rice cooker manufactured by the A company. The unique control code table of FIG. 6 may be collectively included in one server 300 illustrated in FIG. 1. In addition, each unique control code table may be included in its own maker by separating the unique control code table to the server for each maker.

In addition, the cooperation control table is a table that describes, as illustrated in FIG. 7, for example, setting for performing the device cooperation control of each device illustrated in FIG. 1.

In a case where the control source device (corresponding to device 200-1 in FIG. 1) configuring the first device is in the specific status in accordance with contents described in the cooperation control table, device control apparatus 100 illustrated in FIG. 1 controls the control destination device (corresponding to device 200-2 in FIG. 1) configuring the second device so that the control destination device performs a specific operation.

Specifically, the cooperation control table describes types of the control destination devices, operations which are performed by the control destination devices, the control commands or the control codes for instructing operations, together with types of the control source devices and statuses of the control source devices. No described in the cooperation control table of FIG. 7 is described for the sake of convenience of description. That is, No is not essential item described in the cooperation control table.

The cooperation control table may set the contents of the device cooperation control preferred by a user by using input unit 103 of device control apparatus 100. In addition, a maker of a device describes the contents of original device cooperation control on the cooperation control table by setting the contents and the cooperation control table may be set by being distributed to device control apparatus 100.

Each table indicating the control contents stored in storage unit 102 of device control apparatus 100 is described as described above.

Hereinafter, an example of the device cooperation control of the device cooperation control system in the embodiment will be described in detail using FIG. 8 while referring to FIGS. 1 to 7.

Figure 8:
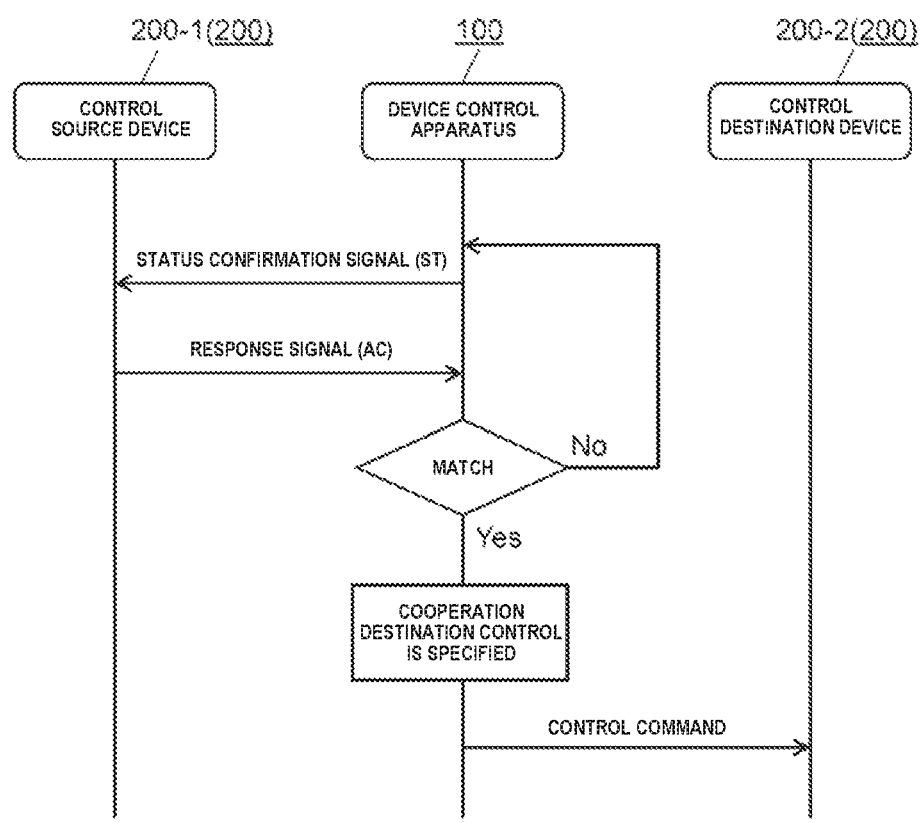
FIG. 8 is a sequence diagram describing an example of device cooperation control of the device cooperation control system in Embodiment 1.

FIG. 8 is a sequence diagram describing an example of a device cooperation control of the device cooperation control system in Embodiment 1. In FIG. 8, the control source device is described as device 200-1 (first device) of FIG. 1 and the control destination device is described as device 200-2 (second device) of FIG. 1.

First, as illustrated in FIG. 8, controller 104 of device control apparatus 100 transmits a status confirmation signal (ST) from transmitting and receiving unit 101 to all devices or one device 200-1 described in the cooperation control table illustrated in FIG. 7 periodically or predetermined time intervals. Status confirmation signal (ST) is a signal by which device control apparatus 100 confirms the status of device 200-1.

Device 200-1 receives status confirmation signal (ST) from device control apparatus 100 in transmitting and receiving unit 201. In this case, controller 203 of device 200-1 determines the status of device 200-1 when receiving status confirmation signal (ST). A content determined by controller 203 is transmitted from transmitting and receiving unit 201 of device 200-1 to device control apparatus 100.

The status of device 200-1 indicates, specifically, for example, that the operation of device 200-1 is stopped, device 200-1 is operated, or the like. Furthermore, the status may indicate detailed operation contents whether device 200-1 is operated at which setting temperature, is operated in which air flow direction and in which air flow rate, is operated in setting of which mode, and the like.

Next, device 200-1 that receives status confirmation signal (ST) transmits response signal (AC) including information indicating the status of driving unit 202 from transmitting and receiving unit 201 to device control apparatus 100 at a time point when being received by transmitting and receiving unit 201 by controlling controller 203.

Next, device control apparatus 100 receives response signal (AC) from device 200-1 in transmitting and receiving unit 101. Controller 104 determines a status included in response signal (AC).

Specifically, it is determined whether or not the status included in response signal (AC) matches, for example, the status of device 200-1 described in the status of the cooperation control table stored in storage unit 102. In this case, if the status included in response signal (AC) does not match the status of device 200-1 described in the cooperation control table, device control apparatus 100 transmits status confirmation signal (ST) from transmitting and receiving unit 101 continuously and periodically.

On the other hand, if the status included in response signal (AC) matches the status of device 200-1 described in the cooperation control table, controller 104 specifies device 200-2 that is the control destination device, the operation, and the control command corresponding to the operation using the cooperation control table.

Transmitting and receiving unit 101 transmits the specified control command to device 200-2 that is the control destination device.

Next, if transmitting and receiving unit 201 of device 200-2 receives a predetermined specified control command, controller 203 of device 200-2 changes the operation of driving unit 202 in accordance with the control command.

The device cooperation control of the device cooperation control system is executed as described above.

Figure 9:
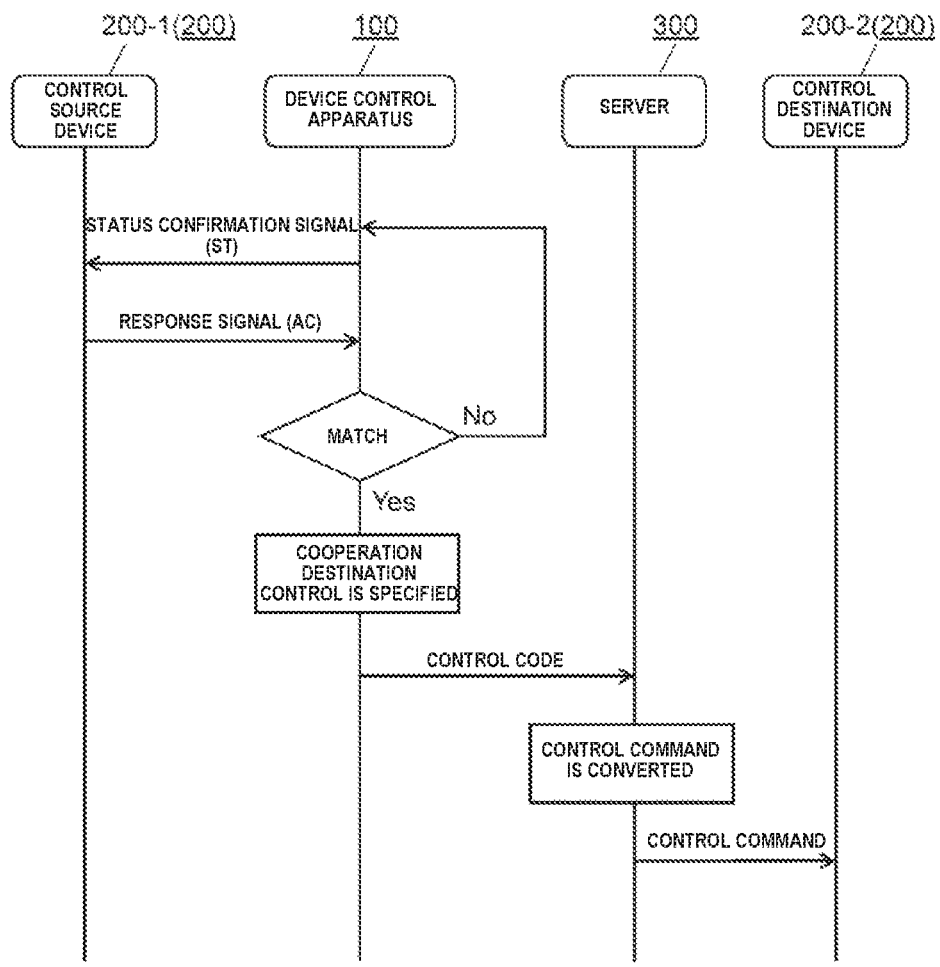
FIG. 9 is a sequence diagram describing another example of the device cooperation control of the device cooperation control system in Embodiment 1.

Other than the above, the device cooperation control system in the embodiment may execute the device cooperation control as illustrated in FIG. 9.

FIG. 9 is a sequence diagram describing another example of the device cooperation control of the device cooperation control system in Embodiment 1. Similar to FIG. 8, in FIG. 9, the control source device is described as device 200-1 and the control destination device is described as device 200-2. Device 200-2 is controlled by device control apparatus 100 via server 300. That is, the example is different from the embodiment described above in that the device cooperation control is executed via server 300.

Specifically, first, as illustrated in FIG. 9, controller 104 of device control apparatus 100 transmits status confirmation signal (ST) from transmitting and receiving unit 101 to all devices or one device 200-1 described in the cooperation control table illustrated in FIG. 7 periodically or predetermined time intervals.

Status confirmation signal (ST) from device control apparatus 100 is received by transmitting and receiving unit 201 of device 200-1.

Next, controller 203 of device 200-1 transmits response signal (AC) including the information indicating the status of driving unit 202 from transmitting and receiving unit 201 to device control apparatus 100 at a time point when receiving status confirmation signal (ST).

Next, device control apparatus 100 receives response signal (AC) from device 200-1 in transmitting and receiving unit 101. Controller 104 determines a status included in response signal (AC).

Specifically, it is determined whether or not the status included in response signal (AC) matches, for example, the status of device 200-1 described in the status of the cooperation control table stored in storage unit 102. In this case, if the status included in response signal (AC) does not match the status of device 200-1 described in the cooperation control table, device control apparatus 100 periodically transmits status confirmation signal (ST) from transmitting and receiving unit 101.

On the other hand, if the status included in response signal (AC) matches the status of device 200-1 described in the cooperation control table, controller 104 of device control apparatus 100 transmits the control code and the address of device 200-2 that is the control destination device from transmitting and receiving unit 101 to the predetermined server 300 in accordance with the address of the transmitting destination (see FIG. 6) indicated in the unique control code table.

Server 300 receives the control code and the address of device 200-2 transmitted from transmitting and receiving unit 101 of device control apparatus 100 in transmitting and receiving unit 301.

Controller 303 of server 300 specifies the control command corresponding to the control code using control code converter 302. Transmitting and receiving unit 301 of server 300 transmits the specified control command to device 200-2 that is the control destination device.

Next, device 200-2 receives a predetermined control command that is specified from server 300 in transmitting and receiving unit 201. Therefore, controller 203 of device 200-2 changes the operation of driving unit 202 in accordance with the received control command.

As described above, in the control of the control destination device (device 200-2) from device control apparatus 100, if the control content is defined in the standard control command, the control is performed in the sequence illustrated in FIG. 8. On the other hand, the control content is not the standard control command but the unique control content of a maker, the control is performed in the sequence illustrated in FIG. 9. Therefore, it is possible to easily perform the device cooperation control with respect to various devices of which makers are different from one another.

At least a part of functions (for example, storage unit 102 and controller 104) of device control apparatus 100 illustrated in FIGS. 8 and 9 may be also adapted in the configuration that is performed in server 300. In addition, in FIG. 9, at least a part of functions (for example, control code converter 302 and controller 303) of server 300 may be also adapted in the configuration that is performed in device control apparatus 100.

Hereinafter, a process flow of the device control apparatus of the device cooperation control system in the embodiment will be described in detail with reference to FIG. 10.

Figure 10:
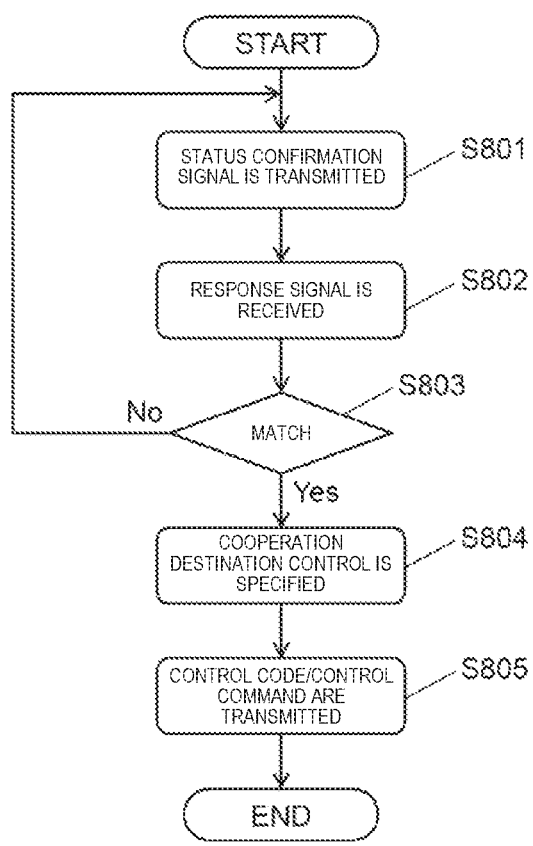
FIG. 10 is a diagram illustrating a process flow of a device control apparatus in Embodiment 1.

FIG. 10 is a diagram illustrating a process flow of the device control apparatus in Embodiment 1.

First, as illustrated in FIG. 10, transmitting and receiving unit 101 of device control apparatus 100 periodically transmits status confirmation signal (ST) to each control source device (for example, device 200-1 and the like) described in the cooperation control table illustrated in FIG. 7 (step S801).

Transmitting and receiving unit 101 receives response signal (AC) with respect to status confirmation signal (ST) (step S802).

Next, controller 104 determines whether or not the status included in response signal (AC) matches the status of the control source device described in the cooperation control table (step S803). In this case, if they do not match (No in step S803), process steps are repeatedly executed from step S801.

On the other hand, if they match (Yes in step S803), controller 104 specifies the control destination device (for example, device 200-2 and the like), the operation, and the control command corresponding to the operation using the cooperation control table (step S804).

Transmitting and receiving unit 101 transmits the control command or the control code illustrated in FIG. 7 in association with the operation of the control destination device (step S805).

It is possible for the device control apparatus 100 to perform the device cooperation control with respect to devices of various makers by the process flow described above.

That is, the device cooperation control system of the embodiment transmits status confirmation signal (ST) to the control source device (first device). Response signal (AC) with respect to status confirmation signal (ST) is received. Therefore, in a case where the status of the control source device is changed, even in a specification in which a status is not notified to the device control apparatus, the device control apparatus can grasp the status of the control source device. Thus, it is possible to realize the cooperation control to the control destination device (second device) without delay.

The specific device control apparatus, the device, the method for controlling devices are described as examples of the configurations in which the cooperation control is performed in the devices which are individually configured and the like, but the invention is not limited to the configurations. For example, the device cooperation control system configured of the device control apparatus, the device, the method for controlling devices may be realized by a program of a computer. In this case, the computer may be configured of a form such as a program, a recording medium storing the program, a communication medium transporting the program. Therefore, it is possible to construct the device cooperation control system which is excellent in versatility and is easy to be changed.

Embodiment 2

Hereinafter, a device cooperation control system in Embodiment 2 will be described with reference to FIGS. 11 and 12.

Figures 11, 12:
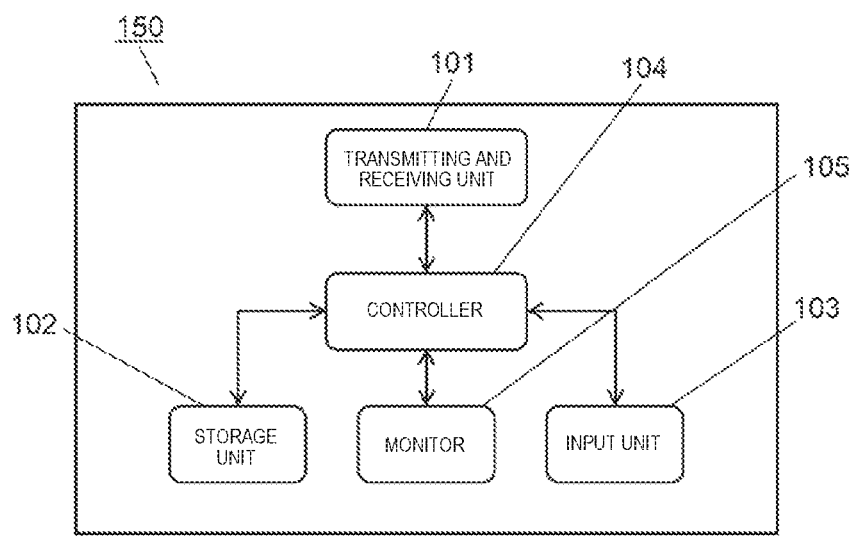
FIG. 11 is a configuration diagram of a device control apparatus in Embodiment 2.
FIG. 12 is a diagram illustrating an example of a cooperation control table in Embodiment 2.

FIG. 11 is a configuration diagram of the device control apparatus in Embodiment 2. FIG. 12 is a diagram illustrating an example of a cooperation control table in Embodiment 2.

As illustrated in FIG. 11, the device cooperation control system of the embodiment is different from that of Embodiment 1 in that monitor 105 is further provided in device control apparatus 150.

Monitor 105 of device control apparatus 150 detects whether or not there is a problem in a setting content of a cooperation control table, for example, illustrated in FIG. 12.

Hereinafter, an example of a method for detecting of monitor 105 will be described in detail.

In the cooperation control table illustrated in FIG. 12, lighting is set, for example, as a control source device in No. 1 and No. 2.

First, controller 104 of device control apparatus 150 confirms whether or not a status of lighting that is the control source device is an ON status. If the ON status of the lighting is confirmed, controller 104 causes a television that is set as the control destination device in the cooperation control table to be the ON status (power supply is turned on) via transmitting and receiving unit 101. Furthermore, the air conditioner that is the control destination device is in the ON status and the operation is started by setting a setting temperature to be 23 degrees.

However, thereafter, controller 104 confirms whether or not the television that is set in the control source device is in the ON status in which power supply is turned on by No. 3 of the cooperation control table. In this case, if the ON state of the television is confirmed, controller 104 causes the lighting that is set in the control destination device to be an OFF status (power supply is turned off) in No. 3.

Next, the television that is the control destination device is turned on if the user turns on the lighting based on No. 1 of the cooperation control table. Thereafter, if controller 104 confirms the ON status of the television based on No. 3 of the cooperation control table, now, the lighting that is the control destination device is turned off. Therefore, a loop is generated in the operations of ON and OFF of the lighting and the television, and disadvantage that the operations of ON and OFF are repeated occurs.

Thus, in order to solve the disadvantage, monitor 105 of the embodiment confirms whether or not the same content is set in the control source device and in the status from the setting content of the cooperation control table in association with the control destination device and the operation.

In a case where the same content as the control destination device and the operation thereof are set in the control source device and the status thereof (for example, No. 1 and No. 3), it is detected whether or not setting of a status conflicting the control destination device and the operation thereof corresponding to the control source device exists in the cooperation control table.

In this case, if setting of the conflicting status exists in the cooperation control table, monitor 105 notifies a change or cancellation of the setting content to the user, for example, via a notifying unit (not illustrated) and warns the user of the change or the cancellation thereof.

The status conflicting the operation described above means that, for example, a status conflicting ON is OFF. In addition, a status conflicting temperature rise is temperature fall. Furthermore, a heating operation conflicts a cooling operation. That is, it is an operation indicating a reverse status against an operation that is assumed by the user.

In addition, in the embodiment described above, a configuration in which monitor 105 monitors the conflicting operation is described as an example, but the invention is not limited to the example. For example, monitor 105 confirms the control destination device and the operation thereof from the cooperation control table and may also confirm whether or not dangerous operation setting is provided with respect to the control destination device. Therefore, it is possible to confirm a safe operation of each device. Specifically, in a state where the air conditioner is in the ON status, it corresponds to a case of temperature setting out of a predetermined temperature range such as setting of the temperature is 32 degrees in the cooling operation. In this case, similar to the above description, monitor 105 notifies a change or cancellation of the setting content to the user via a notifying unit (not illustrated) and warns the user of the change or the cancellation thereof.

In addition, monitor 105 may be configured to store in advance setting of the control source device and setting of the control destination device that is generally incomprehensible or contradicted, for example, a television installed in a room where there is lighting is turned on after the OFF status of the lighting is confirmed. Monitor 105 notifies the change or cancellation of the setting content, and may warn those in a case where the incomprehensible setting is detected.

In addition, monitor 105 may be configured to notify and warn the user by detecting certain setting of infinity (infinite loop) or certain setting of contradiction by detecting the setting indicated as follows. Specifically, for example, first, if the OFF status of the lighting that is the control source device is confirmed, the television that is the control destination device is in the ON status. Thereafter, if the ON status of the television that is the control source device is confirmed, the lighting that is the control destination device is in the OFF status. Furthermore, thereafter, if the OFF status of the lighting that is the control source device is confirmed again, certain setting of infinity, for example, the television that is the control destination device is in the ON status may be provided.

As described above, the device cooperation control system of the embodiment includes monitor 105 in device control apparatus 150. Therefore, even if the user freely sets the cooperation control content, it is possible to secure safe use of the device cooperation control system.

In the embodiment described above, a configuration in which monitor 105 is provided in device control apparatus 150 is described as an example, but the invention is not limited to the example. For example, monitor 105 may be provided in the server illustrated in FIG. 1 or 9.

In addition, in the embodiment described above, monitoring timing of monitor 105 is not particularly mentioned, but, for example, monitoring may be periodically performed such as once a day. Furthermore, when a cooperation control table is newly set or edited, monitoring of the control content may be performed in monitor 105.

In addition, in each embodiment described above, a configuration in which the status of the control source device and the operation of the control destination device as in the cooperation control table illustrated in FIG. 7 or 12 correspond in one-to-one or one-to-two is described as an example, but the invention is not limited to the example. For example, the device cooperation control system may be constructed based on a modification example of the cooperation control table which is described as follows with reference to FIGS. 13 to 15.

FIG. 13 is a diagram illustrating a modification example of the cooperation control table in Embodiment 2.

As illustrated in FIG. 13, the cooperation control table is different from the cooperation control table illustrated in FIG. 7 or 12 in that an additional operation is provided.

Hereinafter, a control operation will be described in detail with reference to the cooperation control table of FIG. 13.

As illustrated in the cooperation control table of FIG. 13, first, in controller 104, for example, it is confirmed whether or not a status of lighting that is the control source device which is set in No. 1 is an ON status. If the ON status of the lighting is confirmed, controller 104 causes a television that is the control destination device to be the ON status (power supply is turned on). In this case, as in the cooperation control table of Embodiment 1 illustrated in FIG. 7, if the additional operation cannot be set, immediately after the television is turned on, the air conditioner is turned on and the operation of the air conditioner is started.

Thus, in the embodiment, as illustrated in FIG. 13, the additional operation is set in the cooperation control table. Thus, as illustrated in No. 2 of the cooperation control table, the television of the control source device is in the ON status (power supply is turned on) and then after two seconds, the control operation, for example, the air conditioner of the control destination device is in the ON status can be performed.

Next, another modification example of the cooperation control table will be described with reference to FIG. 14.

FIG. 14 is a diagram illustrating another modification example of the cooperation control table in Embodiment 2.

As illustrated in FIG. 14, the cooperation control table is configured such that a plurality of control destination devices can be set.

Hereinafter, a control operation will be described in detail with reference to the cooperation control table of FIG. 14.

As illustrated in the cooperation control table of FIG. 14, in controller 104, it is confirmed whether or not a status of lighting that is the control source device is in an ON status. If the ON status of the lighting is confirmed, controller 104 causes a television that is the control destination device to be in the ON status (power supply is turned on), the air conditioner is to be in the ON status and the operation is started. Specifically, control code w1 illustrated in FIG. 14 is transmitted to the television that is a second device, control code t1 is transmitted an air conditioner that is a third device, and each device is controlled. Therefore, a plurality of control destination devices can be controlled simultaneously. In a case of FIG. 14, for example, lighting corresponds to the first device, the television corresponds to the second device, and the air conditioner corresponds to the third device. That is, it is possible to control the second device and the third device based on the status of the first device.

Next, further another modification example of the cooperation control table will be described with reference to FIG. 15.

FIG. 15 is a diagram illustrating further another modification example of the cooperation control table in Embodiment 2.

As illustrated in FIG. 15, the cooperation control table is configured such that a plurality of control source devices can be set.

Hereinafter, a control operation will be described in detail with reference to the cooperation control table of FIG. 15.

As illustrated in the cooperation control table of FIG. 15, first, in controller 104, it is confirmed whether or not statuses of lighting and a ventilation fan that are the control source devices are in ON statuses. If the ON statuses of the lighting and the ventilation fan are confirmed, controller 104 causes a television that is the control destination device to be the ON status (power supply is turned on). Therefore, the control destination device can be controlled based on the statuses of the plurality of control source devices. In a case of FIG. 15, for example, the lighting corresponds to the first device, the ventilation fan corresponds to the third device, and the television corresponds to the second device. That is, it is possible to control the second device based on a combination of the statuses of the first device and the third device.

As described above based on the modification example, the device cooperation control system which can perform the device cooperation control using more control patterns can be constructed by freely setting the cooperation control table.

Embodiment 3

In the device cooperation control system of Embodiments 1 and 2 described above, first, device control apparatus 100 transmits status confirmation signal (ST). That is, the status of device 200-1 is grasped by response signal (AC) from device 200-1 that is the control source device which receives status confirmation signal (ST). The configuration, in which the operation of device 200-2 that is the control destination device is changed based on the status of device 200-1, is provided.

However, a specification for transmitting the status of the device from the device side may be also employed by a policy of a maker manufacturing the device. In addition, a specification for transmitting the status of the device from the device side to device control apparatus 100 when the status of the device is changed may be also employed.

Then, the device cooperation control system of the embodiment is configured such that whether or not status confirmation signal (ST) is transmitted from the device control apparatus to the control source device can be selected.

That is, the device cooperation control system of the embodiment includes a mode switching unit for switching two command modes indicated as follows.

First, similar to Embodiments 1 and 2, there is a first communication mode in which status confirmation signal (ST) is transmitted and response signal (AC) is received. In a case where the status of the control source device is changed even if status confirmation signal (ST) is not transported, there is a second communication mode in which the status is transmitted from the control source device side regardless of status confirmation signal (ST). As described below, the mode switching unit is configured of a communication mode controller, a communication mode setting unit, and the like.

Hereinafter, a device cooperation control system in Embodiment 3 will be described in detail with reference to FIGS. 16 and 17. Detailed description of the same configuration and operation as those of the device cooperation control system in Embodiment 1 will be omitted. Hereinafter, a configuration and an operation different from those of Embodiment 1 will be described mainly.

Figure 16:
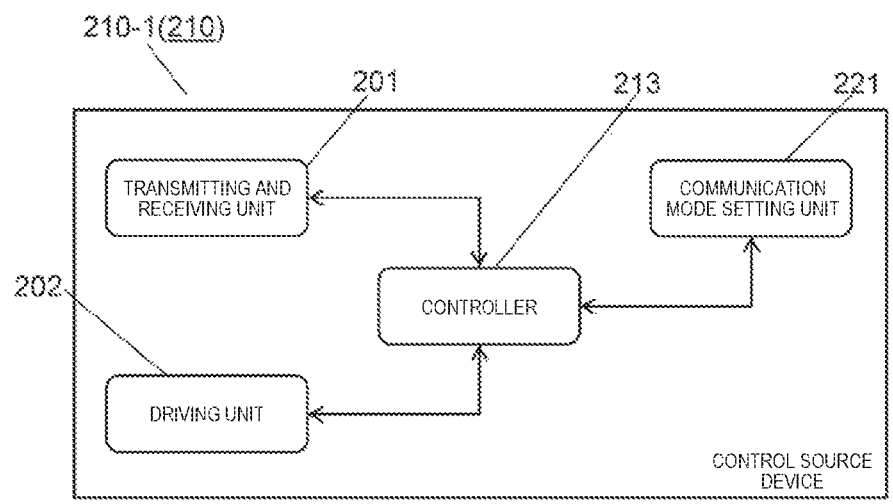
FIG. 16 is a configuration diagram of a control source device in Embodiment 3.

FIG. 16 is a configuration diagram of a control source device in Embodiment 3. FIG. 17 is a configuration diagram of a device control apparatus in Embodiment 3.

As illustrated in FIG. 16, device 210-1 that is the control source device (first device) of the embodiment is different from that of Embodiments 1 and 2 in that device 210-1 includes communication mode setting unit 221. In addition, as illustrated in FIG. 17, Embodiment 3 is different from Embodiments 1 and 2 in that communication mode controller 112 is provided in device control apparatus 160.

First, communication mode setting unit 221 of device 210-1 illustrated in FIG. 16 sets two command modes as follows. A first mode is the first communication mode which is configured of a "status confirmation signal receiving mode" in which status confirmation signal (ST) is received from the device control apparatus and response signal (AC) is returned. A second mode is the second communication mode which is configured of a "status change signal transmitting mode" in which a status change signal is transmitted when the status of device 210-1 is changed even if status confirmation signal (ST) is not transmitted from the device control apparatus. In Embodiments 1 and 2, a case where the cooperation control is performed only by using the "status confirmation signal receiving mode" is described as an example.

In the embodiment, setting of each communication mode in communication mode setting unit 221 of device 210-1 is executed by an instruction from communication mode controller 112 of device control apparatus 160 which is described below.

Figure 17:
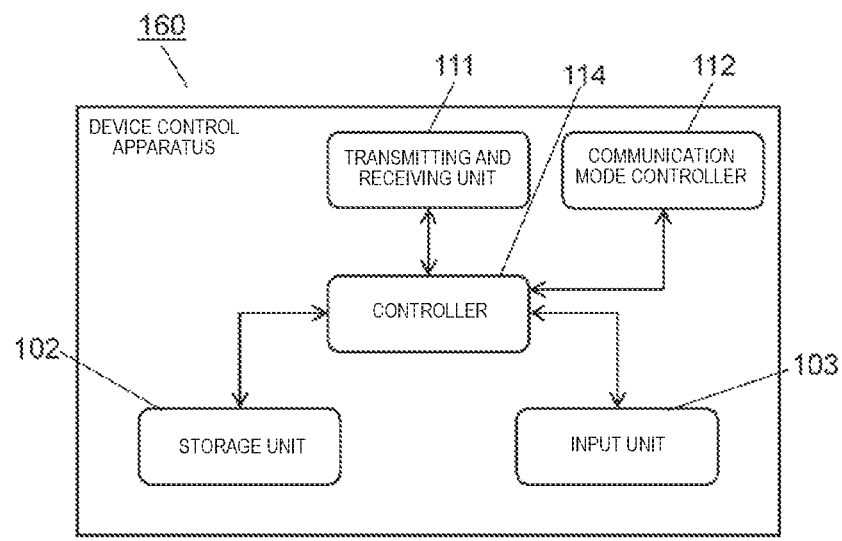
FIG. 17 is a configuration diagram of a device control apparatus in Embodiment 3.

In addition, communication mode controller 112 of device control apparatus 160 illustrated in FIG. 17 controls setting of communication mode setting unit 221 of device 210-1 in accordance with the types and the statuses of devices configuring the control source device or the control destination device.

Device 210-1 and device control apparatus 160 of the embodiment is configured as described above.

Hereinafter, a sequence of the device cooperation control of the device cooperation control system in the embodiment will be described with reference to FIG. 18.

Figure 18:
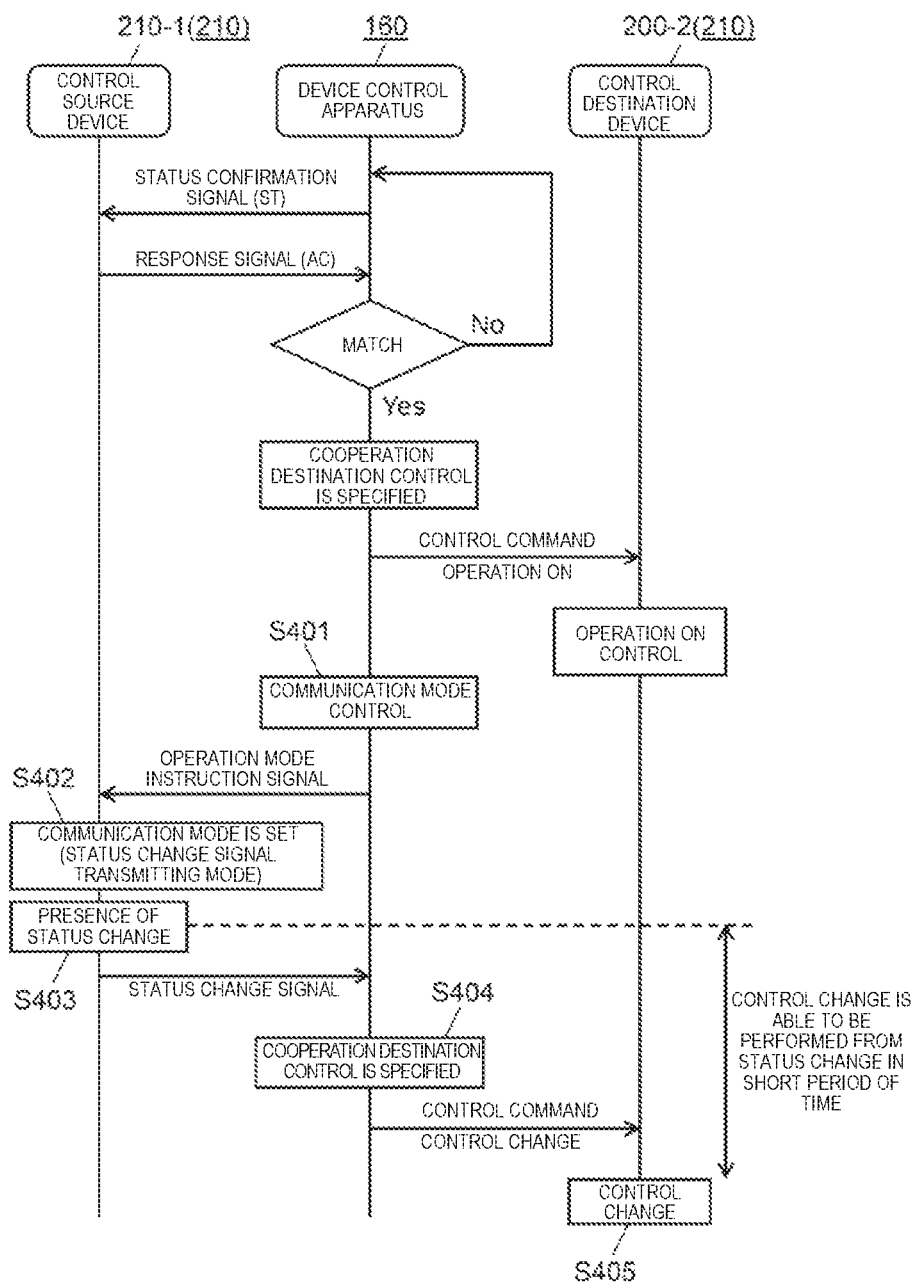
FIG. 18 is a sequence diagram describing an example of device cooperation control of the device cooperation control system in Embodiment 3.

FIG. 18 is a sequence diagram describing an example of a device cooperation control of the device cooperation control system in Embodiment 3.

A sequence following operation ON control of device 200-2 that is the control destination device (second device) by receiving the control command from device control apparatus 160 described in FIG. 8 will be described with reference to FIG. 18.

As illustrated in FIG. 18, after the operation ON control of device 200-2, communication mode controller 112 of device control apparatus 160 controls the communication mode of device 210-1 that is the control source device (step S401). That is, the communication mode of device 210-1 is switched from the status confirmation signal receiving mode (first communication mode) until now to the status change signal transmitting mode (second communication mode).

Thus, device control apparatus 160 transmits a communication mode instruction signal from transmitting and receiving unit 111 to device 210-1.

Next, device 210-1 which receives the communication mode instruction signal in transmitting and receiving unit 201 is in cooperation with controller 213 and transmitting and receiving unit 201, sets the communication mode, and switches the communication mode from the status confirmation signal receiving mode to the status change signal transmitting mode (step S402). The status change signal transmitting mode (second communication mode) is a mode for transmitting the status change signal in a case where the status of device 210-1 is changed even if status confirmation signal (ST) is not received from device control apparatus 160.

If the status of device 210-1 is changed (step S403), the status change signal is immediately transmitted from transmitting and receiving unit 201 to device control apparatus 160.

Next, device control apparatus 160 which receives the status change signal of device 210-1 in transmitting and receiving unit 111 executes the same process as a case when receiving response signal (AC) described in FIG. 8 of Embodiment 1. That is, even though a part is omitted in FIG. 18, first, device control apparatus 160 receives the status change signal in transmitting and receiving unit 111. Controller 114 determines whether or not a status included in the status change signal matches a status described in the status of device 210-1 of the cooperation control table stored in storage unit 102.

In this case, if the statuses match one another, controller 114 specifies the control destination device, the operation, and the control command corresponding to the operation using the cooperation control table (step S404). Transmitting and receiving unit 111 transmits the specified control command to device 200-2 that is the control destination device.

Next, device 200-2 receives a predetermined control command in transmitting and receiving unit 201.

Controller 203 of device 200-2 changes the control operation of driving unit 202 in accordance with the received control command (step S405).

The device cooperation control system in the embodiment is operated as described above.

That is, in the embodiment, the communication mode of the control source device is switched between the "status confirmation signal receiving mode (first communication mode)" and the "status change signal transmitting mode (second communication mode)". Thus, the cooperation control from presence of the status change of step S403 of FIG. 18 to the control change of step S405 can be executed for a short period of time That is, an exchange time of "presence of the status change, standby of the ST signal, and transporting of AC signal" is shortened by immediately transmitting the status change signal in "presence of the status change". Therefore, the device cooperation control is performed in a short period of time. As a result, it is possible to construct the device cooperation control system which is excellent in responsiveness.

Specifically, in a case where device 200-2 that is the control destination device is the air conditioner, the change in the setting temperature and the change in the flow rate are performed in a short period of time by the second communication mode during the operation ON control. In addition, in a case where device 200-2 is the television, the changes in channel and volume are performed in a short period of time during the operation ON control. Furthermore, in a case where device 200-2 is the lighting, control of a change in brightness and the like are performed in a short period of time during the operation ON control.

In addition, it is possible to perform the cooperation control of energy saving by operation OFF in a short period of time when device 200-2 that is the control destination device is in the operation ON control.

In the embodiment, the communication mode of device 210-1 that is the control source device may not be required to be switched from the "status confirmation signal receiving mode" to the "status change signal transmitting mode" by the type and the operating status of device 200-2 that is the control destination device. In this case, the cooperation control from the presence of the status change of step S403 to the control change of step S405 illustrated in FIG. 18 may be omitted.

In addition, in the embodiment, the method for performing the cooperation control in a short period of time by switching the communication mode is described as an example, but the invention is not limited to the example. For example, in the status confirmation signal receiving mode (first communication mode) in which status confirmation signal (ST) is transmitted from device control apparatus 160 to device 210-1, the transmission frequency of status confirmation signal (ST) may be also increased. Furthermore, transmission intervals of status confirmation signal (ST) may be also shortened. Thus, it is possible to obtain response signal (AC) in a short period of time when the status of device 210-1 is changed.

In a case of the above description, communication mode controller 112 of device control apparatus 160 does not perform switching of the communication mode of device 210-1 that is the control source device. Device 210-1 performs a process to continue the status confirmation signal receiving mode. That is, it is possible to respond by a configuration in which the progresses from step S401 to step S402 illustrated in FIG. 18 are not executed.

As a specific example of a case where the status confirmation signal receiving mode is continued, for example, a case of controlling a device without immediately changing the control is not a problem for the user in accordance with the status change of the control source device as a case where the control destination device is an air purifier. That is, after the user returns home, the operation ON control may be also performed on the control destination device a little later. In addition, when the operating status of the control destination device is safe, for example, there is a case where the setting temperature of the air conditioner is in a predetermined range and the like.

In addition, in the embodiment, the configuration of the device cooperation control system switching the communication mode is described as an example, but the invention is not limited to the example. For example, the following control may be performed in consideration of communication traffic between the devices constructing the device cooperation control system. That is, in a case where the number of the control source devices is equal to or less than a predetermined number (for example, three or less) and the communication traffic is low, the status confirmation signal receiving mode (first communication mode) is continued. On the other hand, in a case where the communication traffic is large, the control is performed by being switched to the status change signal transmitting mode (second communication mode). Therefore, it is possible to construct the device cooperation control system which can be efficiently controlled.

As described above, in the embodiment, communication mode controller 112 of device control apparatus 160 manages the type and the status of the control source device, the type and the status of the control destination device, the number of communication devices, and the communication traffic. The mode is switched from the status confirmation signal receiving mode to the status change signal transmitting mode depending on situations thereof. Furthermore, communication mode controller 112 controls to increase the transmission frequency and decrease the transmission intervals of status confirmation signal (ST). Therefore it is possible to optimally control each device configuring the device cooperation control system depending on the situations. In this case, the situations are notified to the user and the device cooperation control system of user preferences may be constructed by recommendations, confirmation, and the like.

In addition, the status confirmation signal receiving mode (first communication mode) of the embodiment performs the communication with device 210-1 that is the control source device using device control apparatus 160 as a main body and thereby entire control of the communication is easily performed.

In addition, the status change signal transmitting mode (second communication mode) of the embodiment performs the communication only when the status of device 210-1 that is the control source device is changed. Therefore, it is possible to reduce the communication traffic between device 210-1 and device control apparatus 160. Furthermore, since the status change of device 210-1 can be immediately transmitted to device control apparatus 160, it is possible to perform the device cooperation control further smoothly.

In addition, in the embodiment, in either communication mode, a device that receives an initial signal (status confirmation signal and the status change signal) is in a standby status of reception. Therefore, power is consumed in the transmitting and receiving unit of each device and the controller. Thus, after receiving the initial signal, the control is performed by changing the communication mode. Therefore, particularly, in a case of a device driven by a battery, there is a big advantage in power saving.

In the embodiment, in a case where the status of device 210-1 is changed in the status change signal transmitting mode, the mode in which device 210-1 is communicated is described as an example, but the invention is not limited to the example. For example, also in the status change signal transmitting mode, device 210-1 may be configured to transmit response signal (AC) when receiving status confirmation signal (ST) from device control apparatus 160. Therefore, device control apparatus 160 can perform the communication of status confirmation signal (ST) and response signal (AC) with the device of the status confirmation signal receiving mode. The device control apparatus can transmit the status confirmation signal without distinction even if the device of the status confirmation signal receiving mode and the device of the status confirmation signal receiving mode are mixed.

In addition, in the embodiment, as illustrated in FIG. 18, the conversion from the control code to the control command in device control apparatus 160 is described as an example, but the invention is not limited to the example. For example, as described in Embodiment 1 with reference to FIG. 9, the conversion from the control code to the control command is performed in server 300 and may be transmitted to the control destination device. Therefore, the device cooperation control is easily performed with respect to various devices of which makers are different.

As described above, according to the embodiment, the device cooperation control system includes the device control apparatus, the first device (control source device), and the second device (control destination device). The device control apparatus includes the first communication mode (status confirmation signal receiving mode) in which the status confirmation signal is transmitted to the first device and the response signal with respect to the status confirmation signal is received. Furthermore, the device control apparatus includes the transmitting and receiving unit that performs the second communication mode (status change signal transmitting mode) in which the status change signal transmitted when the status is changed in the first device is received, and the storage unit that stores the control contents of the second device corresponding to the first device. The transmitting and receiving unit acquires the control contents to the second device corresponding to the status of the first device included in the response signal or the status change signal from the storage unit and transmits the control contents to the second device.

According to the configuration, in a case where the status of the first device is changed, even in the first communication mode in which the status change is not notified to the device control apparatus, the device control apparatus grasps the status of the first device. It is possible to realize the cooperation control to the second device without delay based on the status of the first device.

Furthermore, in a case where the status of the first device is changed, the device control apparatus can grasp the status of the first device in the second communication mode in which the status change is notified to the device control apparatus. Therefore, it is possible to realize the cooperation control to the second device without delay based on the status of the first device.

In addition, the communication mode controller switches between the first communication mode and the second communication mode in accordance with the type and the status of the first device or the second device. The communication with the first device is performed. Therefore, it is possible to realize the device cooperation control system having high convenience.

Embodiment 4

Hereinafter, a device cooperation control system in Embodiment 4 will be described in detail with reference to FIGS. 19 and 20. In the embodiment, a configuration having three control source devices is described as an example, but, of course, the control source devices may be any number.

In addition, the control source device of the embodiment has the same configuration as that of the control source device of Embodiment 3 described in FIG. 16 and the device control apparatus has the same configuration as that of the device control apparatus of Embodiment 3 described in FIG. 17. Furthermore, the control destination device of the embodiment has the same configuration as that of the control destination device of Embodiment 1 described in FIG. 3. Then, detailed descriptions of the control source device, the device control apparatus and the control destination device having the same configuration as that of the above description will be omitted.

Figure 19:
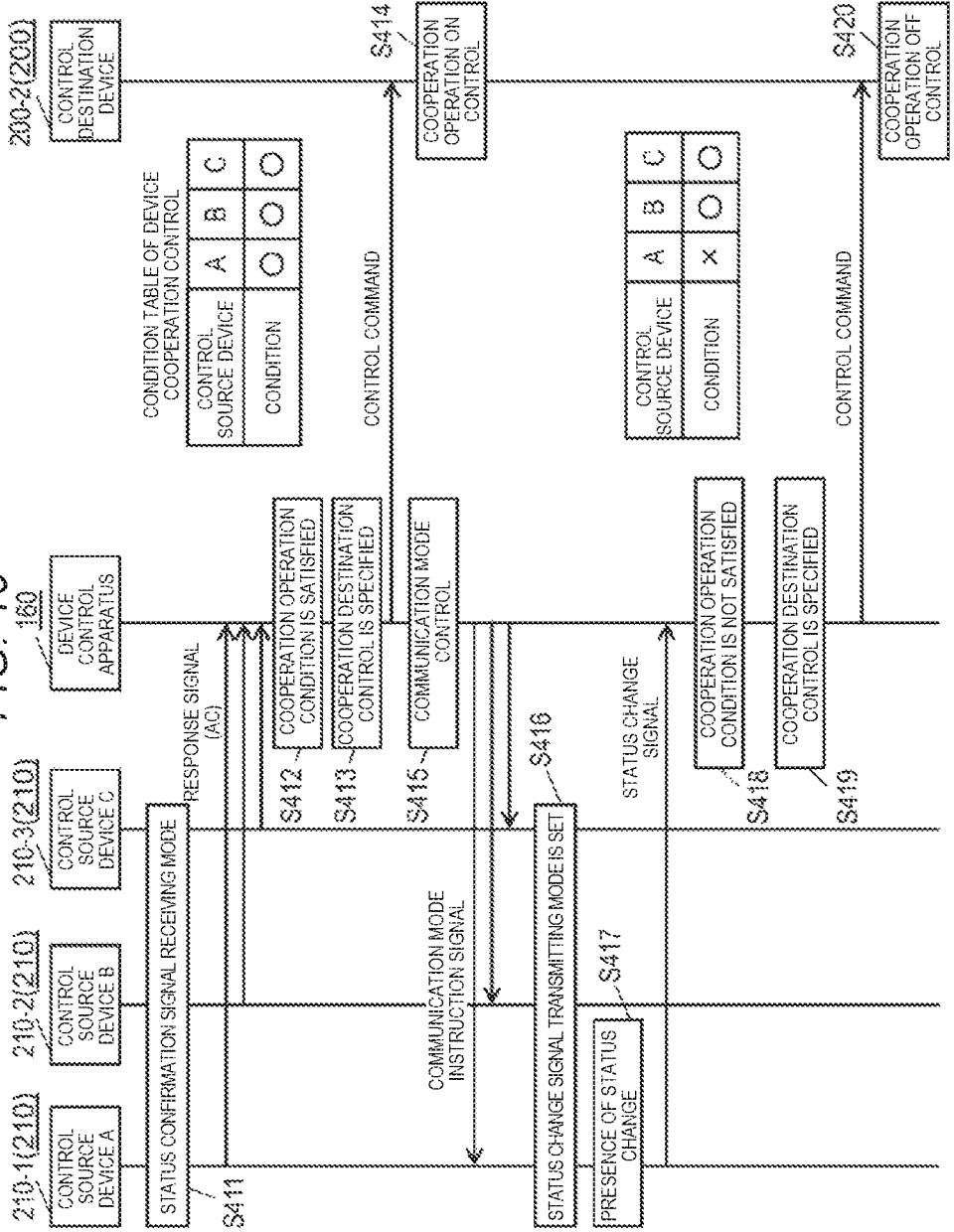
FIG. 19 is a sequence diagram describing an example of a device cooperation control of a device cooperation control system in Embodiment 4.

FIG. 19 is a sequence diagram describing an example of a device cooperation control of the device cooperation control system in Embodiment 4. FIG. 20 is a sequence diagram describing an example of the device cooperation control of the device cooperation control system in Embodiment 4.

A sequence following the operation ON control of device 200-2 that is the control destination device by receiving the control command from device control apparatus 160 described in FIG. 8 will be described with reference to FIGS. 19 and 20.

First, similar to FIG. 8, the operation ON control of device 200-2 that is the control destination device is performed by receiving the control command from device control apparatus 160.

In this case, as illustrated in FIG. 19, initially, the communication mode of devices 210-1, 210-2, and 210-3 that are three control source devices A, B, and C is the status confirmation signal receiving mode (first communication mode) (step S411).

A process in which status confirmation signal (ST) (not illustrated) from device control apparatus 160 is received by transmitting and receiving unit 201 of each device and response signal (AC) is returned is the same as that of Embodiment 1 illustrated in FIG. 8.

Next, even though the status change of each device is not illustrated, similar to Embodiment 1, device control apparatus 160 receives response signal (AC) in transmitting and receiving unit 111. Controller 114 determines whether or not a status included in response signal (AC) matches a status described in the status of devices 210-1, 210-2, and 210-3 of the cooperation control table stored in storage unit 102. In this case, if they do not match, status confirmation signal (ST) is continuously and periodically transmitted from transmitting and receiving unit 111.

On the other hand, if they match, controller 114 specifies device 200-2 that is the control destination device, the operation, the control command corresponding to the operation using the cooperation control table.

In this case, in the embodiment, the cooperation control table stored in storage unit 102 is configured to control device 200-2 that is the control destination device when the status included in response signal (AC) received from three devices 210-1, 210-2, and 210-3 is provided. That is, the device cooperation control system is configured to perform the device cooperation control by three conditions by the status change of three devices 210-1, 210-2, and 210-3.

Then, in FIG. 19, first, description is made from a status in which three devices 210-1, 210-2, and 210-3 satisfy the conditions described above and the conditions of the device cooperation control are satisfied (three "O" are provided in a condition table of the device cooperation control in the drawing) (step S412).

Next, if the conditions of the device cooperation control are satisfied, controller 114 specifies device 200-2 that is the control destination device, the operation, and the control command corresponding to the operation using the cooperation control table (step S413).

Transmitting and receiving unit 111 transmits a specified predetermined control command to device 200-2 that is the control destination device.

Next, transmitting and receiving unit 201 of device 200-2 receives the predetermined control command in transmitting and receiving unit 201. Controller 203 of device 200-2 changes the operation of device 200-2 to perform cooperation operation ON control in the operation of driving unit 202 in accordance with the received control command (step S414).

Next, after the cooperation operation ON control of device 200-2 is performed, as illustrated in FIG. 19, communication mode controller 112 of device control apparatus 160 controls the communication mode of three devices 210-1, 210-2, and 210-3 (step S415). That is, the communication mode of devices 210-1, 210-2, and 210-3 is switched from the status confirmation signal receiving mode (first communication mode) until now to the status change signal transmitting mode (second communication mode). Device control apparatus 160 transmits the communication mode instruction signal from transmitting and receiving unit 111 to devices 210-1, 210-2, and 210-3.

Next, devices 210-1, 210-2, and 210-3 receiving the communication mode instruction signal in transmitting and receiving unit 201 cooperates with controller 213 and transmitting and receiving unit 201, and switch the communication mode from the status confirmation signal receiving mode to the status change signal transmitting mode (step S416). Therefore, devices 210-1, 210-2, and 210-3 transmit the status change signal to device control apparatus 160 in a case where the status of each device is changed even if status confirmation signal (ST) is not transmitted from device control apparatus 160 in the status change signal transmitting mode.

Therefore, as illustrated in FIG. 19, for example, if the status of device 210-1 is changed (step S417), the status change signal is immediately transmitted from transmitting and receiving unit 201 of device 210-1 to device control apparatus 160.

In this case, in FIG. 19, in the status change of step S417, the status of device 210-1 is changed with respect to the device cooperation control conditions by three conditions that are satisfied in step S412.

Then, hereinafter, in step S417, description is given assuming a change on a status in which three conditions of the cooperation operation ON control are not satisfied. That is, description is given assuming a case where control source device A (device 210-1) is "x" in a condition table of the device cooperation control in FIG. 19.

First, device control apparatus 160 receives the status change signal of device 210-1 in transmitting and receiving unit 111. In this case, controller 114 determines whether or not the status included in the status change signal matches the status described in the status of device 210-1 of the cooperation control table stored in storage unit 102. As a result, controller 114 determines they do not match. That is, the condition of the cooperation operation is not satisfied by the change in the status of device 210-1 (step S418).

Thus, controller 114 specifies the control destination device, the operation, and the control command corresponding to the operation in non-satisfaction of the cooperation operation condition using the cooperation control table. The control command described above corresponds to a control command for releasing the cooperation operation by performing OFF control with respect to the cooperation operation ON control executed in steps S413 and S414.

Next, transmitting and receiving unit 111 transmits the control command for releasing the cooperation operation with respect to device 200-2.

Next, controller 203 of device 200-2 receives the control command. Controller 203 changes the operation of driving unit 202 in accordance with the received control command to perform the cooperation operation OFF control (step S420).

The following sequence of the device cooperation control system will be described with reference to FIG. 20.

Figure 20:
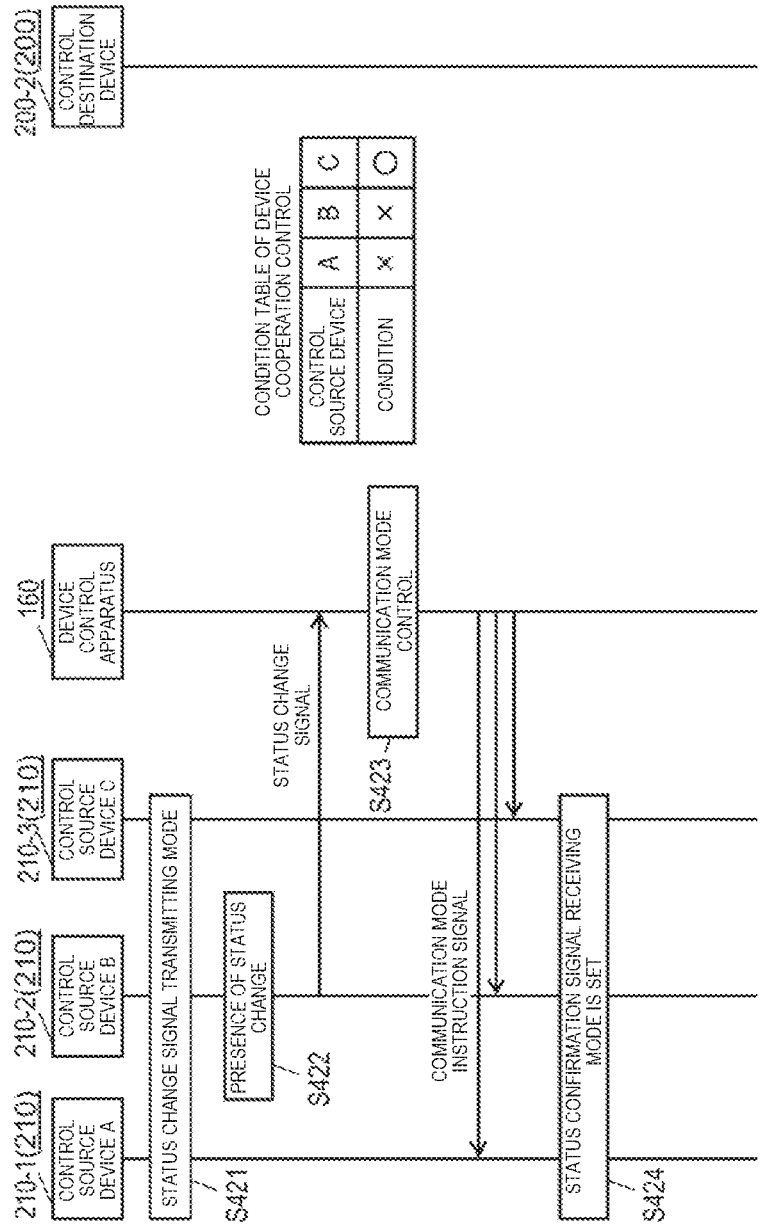
FIG. 20 is a sequence diagram describing an example of the device cooperation control of the device cooperation control system in Embodiment 4.

As illustrated in FIG. 20, in a case where the cooperation operation OFF control illustrated in FIG. 19 is performed (step S420), the communication mode of devices 210-1, 210-2, and 210-3 that are control source devices A, B, and C continue the status change signal transmitting mode (second communication mode) (step S421).

In the status described above, hereinafter, a case where the status of device 210-2 is changed will be described.

In this case, as described above, device 210-2 is in the status change signal transmitting mode (second communication mode). Therefore, transmitting and receiving unit 201 of device 210-2 immediately transmits the status change signal to device control apparatus 160.

In FIG. 20, the status of device 210-2 is further changed in the device cooperation control condition by the three conditions satisfied in step S412 by the status change of step S422.

Then, hereinafter, in step S422, description is given assuming the change in the status in which the condition of the cooperation operation ON control is not satisfied. In this case, the conditions of device 210-1 and device 210-2 are not satisfied. That is, description is given assuming a case where control source device B (device 210-2) is further "x" in a condition table of the device cooperation control in FIG. 20.

First, as illustrated in FIG. 20, communication mode controller 112 of device control apparatus 160 controls the communication mode of three devices 210-1, 210-2, and 210-3 (step S423). Specifically, the communication mode of three devices 210-1, 210-2, and 210-3 is switched from the status change signal transmitting mode (second communication mode) until now to the status confirmation signal receiving mode (first communication mode).

Device control apparatus 160 transmits the communication mode instruction signal from transmitting and receiving unit 111 to devices 210-1, 210-2, and 210-3.

Next, devices 210-1, 210-2, and 210-3 which receive the communication mode instruction signal in transmitting and receiving unit 201 set the communication mode and switch the mode from the status change signal transmitting mode to the status confirmation signal receiving mode in cooperation with controller 213 and transmitting and receiving unit 201 (step S424).

That is, in the embodiment, after three conditions of the device cooperation control are satisfied from step S415 to step S416 of FIG. 19, the communication mode of devices 210-1, 210-2, and 210-3 is switched from the status confirmation signal receiving mode to the status change signal transmitting mode. Therefore, in a case where the status of devices 210-1, 210-2, and 210-3 is changed, it is possible to execute the cooperation control from the presence of the status change of step S417 to the cooperation operation OFF control of step S420 illustrated in FIG. 19 in a short period of time. As a result, energy saving and safety of the device are improved.

In addition, in the embodiment, after at least one of the conditions of the device cooperation control is not satisfied from step S422 to step S424 of FIG. 20, the communication mode of each device is switched from the status change signal transmitting mode to the status confirmation signal receiving mode. Therefore, the communication mode of each device can be returned to the normal status (initial status of step S411 of FIG. 19).

That is, in FIG. 20, the communication mode of each device is switched from the status change signal transmitting mode to the status confirmation signal receiving mode at a time when two conditions of the conditions of the device cooperation control are not satisfied. If the communication mode is switched to the status confirmation signal receiving mode at a time when one of the conditions of the device cooperation control is not satisfied, for example, the status of device 210-1 is changed in step S418 of FIG. 19 and the three conditions of the cooperation operation may be satisfied again. Then, in consideration of the possibility, in a case where the three conditions are satisfied, the status of the status change signal transmitting mode is continued so that the device cooperation control can be immediately returned.

On the other hand, even if the status of any one of devices 210-1 and 210-2 is changed at a time (for example, after step S422 of FIG. 20) when two or more of the conditions of the device cooperation control are not satisfied, the three conditions of the cooperation operation are not immediately satisfied. Then, the communication mode is switched from the status change signal transmitting mode to the status confirmation signal receiving mode and is returned to the original status.

In the embodiment, a case, in which the control is performed so that all control source devices A, B, and C are in the status change signal transmitting mode (second communication mode) at a time of step S416 of FIG. 19 and all control source devices A, B, and C are in the status confirmation signal receiving mode (first communication mode) in step S424, is described as an example, but the invention is not limited to the example. For example, between step S416 and step S424, setting of the communication mode of each of control source devices A, B, and C may be a different control configuration. Therefore, it is possible to perform further efficient device cooperation control in accordance with situations of each control source device.

Specifically, in a case where the conditions of the device cooperation control are not satisfied only in control source device A in step S418 by the status change of control source device A of step S417 of FIG. 19, control source devices B and C may be switched to the status confirmation signal receiving mode.

In this case, between step S418 and step S421, communication mode controller 112 of device control apparatus 160 transmits the communication mode instruction signal for switching to the status confirmation signal receiving mode to control source devices B and C. As a result, in step S421, control source device A is set to the status change transmitting mode and control source devices B and C are set to the status confirmation signal receiving mode.

Therefore, in a case where the status of control source device A is changed, the cooperation operation can be satisfied again. Thus, control source device A continues the status change signal transmitting signal mode and control source devices B and C are set to the status confirmation signal receiving mode.

As described above, according to the embodiment, the communication with the control source device performs by switching the communication mode in accordance with the type and the status of the control source device (first device) or the control destination device (second device) by the communication mode controller. Therefore, it is possible to realize the device cooperation control system having further high convenience.

Embodiment 5

Hereinafter, a device cooperation control system in Embodiment 5 will be described in detail with reference to FIG. 21.

As illustrated in FIG. 21, a device cooperation control system of the embodiment causes the control source device to switch from the status confirmation signal receiving mode (first communication mode) to the status change signal transmitting mode (second communication mode) before performing the device cooperation control of the control destination device (when the condition of the device cooperation control is not satisfied). Therefore, the embodiment is different from Embodiments 3 and 4 in that the status change in the control source device is immediately reflected on the control start of the device cooperation.

The control source device of the embodiment has the same configuration as that of the control source device of Embodiment 3 described in FIG. 16 and the device control apparatus has the same configuration as that of the device control apparatus of Embodiment 3 described in FIG. 17. Furthermore, the control destination device of the embodiment has the same configuration as that of the control destination device of Embodiment 1 described in FIG. 3. Then, detailed descriptions of the control source device, the device control apparatus, and the control destination device having the same configuration as those of the above description will be omitted.

FIG. 21 is a sequence diagram as one example of the device cooperation control of a device cooperation control system in Embodiment 5.

Similar to FIG. 19, the device cooperation control system of the embodiment is described to be configured of three control source devices A, B, and C as an example.

A sequence following the operation ON control of device 200-2 that is the control destination device by receiving the control command from device control apparatus 160 described in FIG. 8 will be described with reference to FIG. 21.

In this case, as illustrated in FIG. 21, initially, the communication mode of devices 210-1, 210-2, and 210-3 that are three control source devices A, B, and C is the status confirmation signal receiving mode (first communication mode) (step S431).

Status confirmation signal (ST) (not illustrated) from device control apparatus 160 is received in transmitting and receiving unit 201 of each device and response signal (AC) is returned.

Next, similar to Embodiment 1, device control apparatus 160 receives response signal (AC) in transmitting and receiving unit 111. Controller 114 determines whether or not the status included in response signal (AC) matches the status described in the status of the control source device of the cooperation control table stored in storage unit 102. In this case, if they do not match, status confirmation signal (ST) is periodically and continuously transmitted from transmitting and receiving unit 111.

On the other hand, if they match, controller 114 specifies device 200-2 that is the control destination device, the operation, and the control command corresponding to the operation using the cooperation control table.

In this case, in the embodiment, the cooperation control table stored in storage unit 102 is configured to control device 200-2 that is the control destination device when the status included in response signal (AC) received from three devices 210-1, 210-2, and 210-3 is provided. That is, the device cooperation control system is configured to perform the device cooperation control by three conditions by the status change of three devices 210-1, 210-2, and 210-3.

Then, in FIG. 21, initially, description is made from a status in which three devices 210-1, 210-2, and 210-3 do not satisfy the conditions described above and the conditions of the device cooperation control are not satisfied (three "x" are provided in a condition table of the device cooperation control in FIG. 21).

In the above status, first, the conditions of device 210-1 are satisfied (device 210-1 is changed from "x" to "O" in the condition table) by the status change of device 210-1 (step S432).

Next, the conditions of device 210-2 are satisfied (device 210-2 is changed from "x" to "O" in the condition table) by the status change of device 210-2 (step S433).

The following sequence will be described assuming a case where two "O" are provided in the condition table of the device cooperation control in FIG. 21.

First, as illustrated in FIG. 21, communication mode controller 112 of device control apparatus 160 controls the communication mode of device 210-3 which is not indicated as "O" in the condition table of the device cooperation control (step S434). That is, the communication mode of device 210-3 is switched from the status confirmation signal receiving mode (first communication mode) that is set in step S431 to the status change signal transmitting mode (second communication mode).

Then, device control apparatus 160 transmits the communication mode instruction signal from transmitting and receiving unit 111 to device 210-3.

Next, device 210-3, which receives the communication mode instruction signal in transmitting and receiving unit 201, switches the communication mode from the status confirmation signal receiving mode (first communication mode) to the status change signal transmitting mode (second communication mode) in cooperation with controller 213 and transmitting and receiving unit 201 (step S435). Therefore, in a case where the status of device 210-1 is changed, device 210-3 transmits the status change signal to device control apparatus 160 even if status confirmation signal (ST)

is not transmitted from device control apparatus 160 in the status change signal transmitting mode.

Thus, as illustrated in FIG. 21, if the status of device 210-3 is changed (step S436), the status change signal is immediately transmitted from transmitting and receiving unit 201 of device 210-3 to device control apparatus 160.

Next, even though not illustrated, similar to step S403 to step S405 of FIG. 18 described in Embodiment 3, device control apparatus 160 receives the status change signal in transmitting and receiving unit 111. Controller 114 determines whether or not the status included in the status change signal matches the status described in the status of the control source device of the cooperation control table stored in storage unit 102.

In this case, if they match, controller 114 specifies device 210-3 that is the control destination device, the operation, and the control command corresponding to the operation using the cooperation control table. Transmitting and receiving unit 111 transmits the control command to device 200-2 that is the control destination device.

Next, controller 203 of device 200-2 receives the control command. Controller 203 changes the operation of driving unit 202 in accordance with the received control command.

That is, in the embodiment, the communication mode of a device that is not indicated in "O" in the condition table of the device cooperation control is switched from the "status confirmation signal receiving mode" to the "status change signal transmitting mode". Therefore, it is possible to execute the cooperation control from the status change in which the condition of the device cooperation control is satisfied to the control of the control destination device in a short period of time.

As described above, according to the embodiment, the communication with the control source device performs by switching the communication mode in accordance with the type and the status of the control source device (first device) or the control destination device (second device) by the communication mode controller. Therefore, it is possible to realize the device cooperation control system having further high convenience.

As described above, the invention provides the device cooperation control system including the device control apparatus, at least the first device and the second device. The device control apparatus includes the transmitting and receiving unit that transmits the status confirmation signal to the first device and receives the response signal with respect to the status confirmation signal, and the storage unit that stores the control content of the second device corresponding to the status of the first device. The transmitting and receiving unit may include a configuration in which the control content of the second device corresponding to the status indicated in the response signal is acquired from the storage unit and is transmitted to the second device.

Therefore, in a case where the status of the first device is changed, the device control apparatus grasps the status of the first device by the response signal with respect to the status confirmation signal even in a case of a configuration in which the status change is not notified to the device control apparatus. Then, the cooperation control of the second device is performed without delay. As a result, it is possible to realize the device cooperation control system which is excellent in responsiveness.

The device cooperation control system of the invention may further include the third device. The storage unit may store the control contents of the second device to correspond to a combination of statuses of the first device and the third device, or the control contents of the second device and the third device to correspond to the status of the first device. Therefore, it is possible to further widen variation of cooperation control.

In addition, the device cooperation control system of the invention may be configured to be able to set the first communication mode in which the response signal is acquired with respect to the status confirmation signal by transmitting the status confirmation signal, and the second communication mode in which the response signal is acquired without transmitting the status confirmation signal.

Therefore, the device control apparatus can grasp the status of the first device while flexibly corresponding in accordance with the specification which is determined by the maker of the first device. That is, in a case where the status of the first device is changed, the device control apparatus can grasp the status of the first device and realize the cooperation control to the second device without delay even in the first communication mode in which the status is not notified to the device control apparatus. Furthermore, in a case where the status of the first device is changed, the device control apparatus can grasp the status of the first device and realize the cooperation control to the second device without delay in the second communication mode in which the status is notified to the device control apparatus.

In addition, in the device cooperation control system of the invention, the control content of the second device stored in the storage unit may include the control code that corresponds to the control command that is able to be recognized by the second device and is not able to be recognized by the second device.

According to the configuration, the control command of the second device can be used for replacing to the control code. Therefore, particularly, in a case where know-how is packed in a specific content of the control command, it is possible to secret the control command to other makers.

In addition, the device cooperation control system of the invention may further include the monitor for monitoring the control content of the second device stored in the storage unit.

Therefore, even in a case where the user freely sets the cooperation control content, it is possible to safely use the device cooperation control system.

In addition, the device control apparatus of the invention includes the transmitting and receiving unit that transmits the status confirmation signal to the first device and receives the response signal with respect to the status confirmation signal, and the storage unit that stores control contents of the second device different from control contents of the first device to correspond to the status of the first device. The transmitting and receiving unit may have the configuration for acquiring the control contents of the second device corresponding to the status indicated in the response signal from the storage unit and transmits the control contents to the second device.

Therefore, only in a case where the status of the first device is changed, the device control apparatus can grasp the status of the first device and realize the cooperation control to the second device without delay even in a case of the specification in which the status change is not notified to the device control apparatus.

In addition, the invention provides the method for controlling the device of the device cooperation control system including the device control apparatus, at least the first device and the second device. The device control apparatus transmits a status confirmation signal to the first device and receives the response signal with respect to the status confirmation signal. Furthermore, the device control apparatus detects whether or not control contents of the second device corresponding to the status indicated by the response signal are stored in the storage unit using the storage unit storing the control contents of the second device to correspond to the status of the first device. The device control apparatus acquires the control contents of the second device corresponding to a status indicated by the response signal from the storage unit and may transmit the control contents to the second device.

Therefore, only in a case where the status of the first device is changed, the device control apparatus can grasp the status of the first device and perform the cooperation control to the second device without delay even in a case of the specification in which the status change is not notified to the device control apparatus.

In addition, the invention provides the device that communicates with the device control apparatus. The device control apparatus includes a configuration for transmitting control contents to the second device different from control contents of the device in accordance with the status of the device. The device may include the transmitting and receiving unit that receives the status confirmation signal transmitted from the device control apparatus and transmits the response signal including the status when receiving the status confirmation signal to the device control apparatus.

Therefore, in a case where the status of the control source device is changed, even in a specification in which the device does not notify the status change to the device control apparatus, the device control apparatus can grasp the status of the device and realize the device that performs the cooperation control to the second device without delay.

In addition, the invention provides the device cooperation control system including the device control apparatus, and at least the first device and the second device. The device control apparatus includes the transmitting and receiving unit that performs the first communication mode in which the status confirmation signal is transmitted to the first device and the response signal is received with respect to the status confirmation signal, and the second communication mode in which the status change signal transmitted when the status of the first device is changed is received, the communication mode controller that switches the first communication mode and the second communication mode, and the storage unit that stores control contents of the second device to correspond to the status of the first device. The transmitting and receiving unit may have the configuration for acquiring the control contents of the second device corresponding to the status of the first device included in the response signal or the status change signal from the storage unit and transmitting the control contents to the second device.

Therefore, in a case where the status of the first device is changed, the device control apparatus can grasp the status of the first device and realize the cooperation control to the second device without delay even in the first communication mode in which the status is not notified to the device control apparatus. Furthermore, in a case where the status of the first device is changed, the device control apparatus can grasp the status of the first device and realize the cooperation control to the second device without delay even in the second communication mode in which the status is notified to the device control apparatus.

In addition, the communication mode controller of the device cooperation control system of the invention may perform communication with the first device by switching the first communication mode and the second communication mode in accordance with the type or the status of the first device or the second device.

Therefore, it is possible to realize the device cooperation control system having further high convenience.

In addition, the device control apparatus of the invention includes the transmitting and receiving unit that performs the first communication mode in which the status confirmation signal is transmitted to the first device and the response signal is received with respect to the status confirmation signal, and the second communication mode in which the status change signal transmitted when the status in the first device is changed is received. Furthermore, the device control apparatus includes the communication mode controller that switches the first communication mode and the second communication mode; and the storage unit that stores control contents of the second device to correspond to the status of the first device. The transmitting and receiving unit may have a configuration for acquiring the control contents of the second device corresponding to the status of the first device included in the response signal or the status change signal from the storage unit and transmitting the control contents to the second device.

Therefore, in a case where the status of the first device is changed, the device control apparatus can grasp the status of the first device and realize the cooperation control to the second device without delay even in the first communication mode in which the status is not notified to the device control apparatus. Furthermore, in a case where the status of the first device is changed, the device control apparatus can grasp the status of the first device and realize the cooperation control to the second device without delay even in the second communication mode in which the status is notified to the device control apparatus.

In addition, the invention provides the method for controlling the device of the device cooperation control system including the device control apparatus, at least the first device and the second device. The device control apparatus includes a first communication mode in which the status confirmation signal is transmitted to the first device and the response signal is received with respect to the status confirmation signal, and the second communication mode in which the status change signal transmitted when the status in the first device is changed is received. Furthermore, the device control apparatus detects whether or not the control contents of the second device corresponding to the status indicated by the response signal or the status change signal are stored in the storage unit using the storage unit storing the control contents of the second device to correspond to the status of the first device. The device control apparatus acquires the control contents of the second device corresponding to the status indicated by the response signal or the status change signal from the storage unit and may transmit the control contents to the second device.

Therefore, in a case where the status of the first device is changed, the device control apparatus can grasp the status of the first device and realize the cooperation control to the second device without delay even in the first communication mode in which the status is not notified to the device control apparatus. Furthermore, in a case where the status of the first device is changed, the device control apparatus can grasp the status of the first device and realize the cooperation control to the second device without delay even in the second communication mode in which the status is notified to the device control apparatus.

In addition, the device cooperation control system of the invention may be configured of a program executed in a computer.

INDUSTRIAL APPLICABILITY

The invention is useful for the device cooperation control system having the plurality of devices, the device control apparatus, the device, the method for controlling the devices, and the like because the status of the first device can be grasped and the cooperation control to the second device can be realized without delay. In addition, the invention is not limited to the devices provided on the inside of a house and is available in a system for performing control in cooperation with a plurality of devices in offices, factories, outdoor, public facilities, and the like.

REFERENCE MARKS IN THE DRAWINGS 100, 150, 160 device control apparatus
101, 111, 201, 301 transmitting and receiving unit
102 storage unit
103 input unit
104, 114, 203, 213, 303 controller
105 monitor
112 communication mode controller
200, 210 device
202 driving unit
221 communication mode setting unit
300 server
302 control code converter

The invention claimed is:

1. A device cooperation control system comprising:
a device control apparatus; and
at least a first device and a second device, wherein a first status of the first device and a second status of the second device are independent from each other and subjected to status changes without receiving device control cooperation from each other in advance;
wherein the device control apparatus includes
a transmitting and receiving unit that transmits a status confirmation signal to the first device and receives from the first device, a response signal with respect to the status confirmation signal as a result of the transmission of the status confirmation signal to the first device, and
a storage unit that stores control contents of the second device to correspond to a status of the first device,
wherein the transmitting and receiving unit acquires the control contents of the second device corresponding to the status of the first device included in the response signal from the storage unit and transmits the control contents to the second device, such that the second device is enabled to receive the control content corresponding to the status of the first device from the device control apparatus irrespective of changes to one of or any combination of: the first status of the first device and the second status of the second device without receiving device control cooperation from each other in advance.

2. The device cooperation control system of claim 1, further comprising:
a third device,
wherein the storage unit stores
the control contents of the second device to correspond to a combination of statuses of the first device and the third device, or
the control contents of the second device and the third device to correspond to the status of the first device.

3. The device cooperation control system of claim 1,
wherein the device control apparatus includes a configuration that is able to set
a first communication mode in which the response signal is acquired with respect to the status confirmation signal by transmitting the status confirmation signal, and
a second communication mode in which the response signal is acquired without transmitting the status confirmation signal.

4. The device cooperation control system of claim 1,
wherein the control contents of the second device stored in the storage unit corresponds to a control command that is able to be recognized by the second device and includes a control code that is not able to be recognized by the second device.

5. The device cooperation control system of claim 1,
wherein the device control apparatus further includes a monitor that monitors the control contents of the second device stored in the storage unit.

6. A device control apparatus comprising:
a transmitting and receiving unit that transmits a status confirmation signal to a first device and receives from the first device, a response signal with respect to the status confirmation signal as a result of the transmission of the status confirmation signal to the first device; and
a storage unit that stores control contents of a second device different from control contents of the first device to correspond to a status of the first device, wherein a first status of the first device and a second status of the second device are independent from each other and subjected to status changes without receiving device control cooperation from each other in advance,
wherein the transmitting and receiving unit has a configuration for acquiring the control contents of the second device corresponding to a status indicated in the response signal from the storage unit and transmitting the control contents to the second device, such that the second device is enabled to receive the control content corresponding to the status of the first device from the device control apparatus irrespective of changes to one of or any combination of: the first status of the first device and the second status of the second device without receiving device control cooperation from each other in advance.

7. A method for controlling a device of a device cooperation control system including a device control apparatus, and at least a first device and a second device, wherein a first status of the first device and a second status of the second device are independent from each other and subjected to status changes without receiving device control cooperation from each other in advance,
wherein the device control apparatus transmits a status confirmation signal to the first device,
receives from the first device, a response signal with respect to the status confirmation signal as a result of the transmission of the status confirmation signal to the first device,
detects whether or not control contents of the second device corresponding to a status indicated by the response signal are stored in a storage unit using the storage unit storing the control contents of the second device to correspond to the status of the first device, and
acquires the control contents of the second device corresponding to a status indicated by the response signal from the storage unit and transmits the control contents to the second device, such that the second device is enabled to receive the control content corresponding to the status of the first device from the device control apparatus irrespective of changes to one of or any combination of: the first status of the first device and the second status of the second device without receiving device control cooperation from each other in advance.

8. A first device that communicates with a device control apparatus,
wherein the first device control apparatus includes a configuration for transmitting control contents to a second device different from those of the first device in accordance with a status of the first device, wherein a first status of the first device and a second status of the second device are independent from each other and subjected to status changes without receiving device control cooperation from each other in advance; and
wherein the first device comprises a transmitting and receiving unit that receives a status confirmation signal transmitted from the device control apparatus and transmits a response signal including a status when receiving the status confirmation signal to the device control apparatus, such that the second device is enabled to receive the control content corresponding to the status of the first device from the device control apparatus irrespective of changes to one of or any combination of: the first status of the first device and the second status of the second device without receiving device control cooperation from each other in advance.

9. A device cooperation control system comprising:
a device control apparatus; and
at least a first device and a second device, wherein a first status of the first device and a second status of the second device are independent from each other and subjected to status changes without receiving device control cooperation from each other in advance;
wherein the device control apparatus includes
a transmitting and receiving unit that performs a first communication mode in which a status confirmation signal is transmitted to the first device and a response signal is received with respect to the status confirmation signal as a result of the transmission of the status confirmation signal to the first device, and a second communication mode in which a status change signal transmitted when a status of the first device is changed is received,
a communication mode controller that switches the first communication mode and the second communication mode, and
a storage unit that stores control contents of the second device to correspond to the status of the first device, and
wherein the transmitting and receiving unit has a configuration for acquiring the control contents of the second device corresponding to the status of the first device included in the response signal or the status change signal from the storage unit and transmitting the control contents to the second device, such that the second device is enabled to receive the control content corresponding to the status of the first device from the device control apparatus irrespective of changes to one of or any combination of: the first status of the first device and the second status of the second device without receiving device control cooperation from each other in advance.

10. The device cooperation control system of claim 9, wherein the communication mode controller performs communication with the first device by switching the first communication mode and the second communication mode in accordance with a type or a status of the first device or the second device.

11. A device control apparatus comprising:
a transmitting and receiving unit that performs a first communication mode in which a status confirmation signal is transmitted to a first device and a response signal is received with respect to the status confirmation signal, and a second communication mode in which a status change signal transmitted when a status in the first device is changed is received;
a communication mode controller that switches the first communication mode and the second communication mode; and
a storage unit that stores control contents of the second device to correspond to the status of the first device,
wherein the transmitting and receiving unit acquires the control contents of the second device corresponding to the status of the first device included in the response signal or the status change signal from the storage unit and transmits the control contents to the second device, such that the second device is enabled to receive the control content corresponding to the status of the first device from the device control apparatus irrespective of changes to one of or any combination of: the first status of the first device and the second status of the second device without receiving device control cooperation from each other in advance, and wherein a first status of the first device and a second status of the second device are independent from each other and subjected to status changes without receiving device control cooperation from each other in advance.

12. A method for controlling a device of a device cooperation control system including a device control apparatus, and at least a first device and a second device, wherein a first status of the first device and a second status of the second device are independent from each other and subjected to status changes without receiving device control cooperation from each other in advance;
wherein the device control apparatus includes a first communication mode in which a status confirmation signal is transmitted to the first device and a response signal is received from the first device as a result of the transmission of the status confirmation signal to the first device, with respect to the status confirmation signal, and a second communication mode in which a status change signal transmitted when a status in the first device is changed is received,
detects whether or not control contents of the second device corresponding to a status indicated by the response signal or the status change signal are stored in a storage unit using the storage unit storing the control contents of the second device to correspond to the status of the first device, and
acquires the control contents of the second device corresponding to the status indicated by the response signal or the status change signal from the storage unit and transmits the control contents to the second device, such that the second device is enabled to receive the control content corresponding to the status of the first device from the device control apparatus irrespective of changes to one of or any combination of: the first status of the first device and the second status of the second device without receiving device control cooperation from each other in advance.

13. A program causing a computer to execute the method for controlling devices of a device cooperation control system of claim 7.

14. A program causing a computer to execute the method for controlling devices of a device cooperation control system of claim 12.

* * * * *